(12) United States Patent
Bose et al.

(10) Patent No.: US 8,080,971 B2
(45) Date of Patent: Dec. 20, 2011

(54) ACTIVE ELECTRICAL POWER FLOW CONTROL SYSTEM FOR OPTIMIZATION OF POWER DELIVERY IN ELECTRIC HYBRID VEHICLES

(75) Inventors: Anima B. Bose, DeKalb, IL (US); Donald S. Zinger, DeKalb, IL (US); ZhiHong Yu, Aurora, IL (US)

(73) Assignee: Northern Illinois University, DeKalb, IL (US)

( * ) Notice: Subject to any disclaimer, the term of this patent is extended or adjusted under 35 U.S.C. 154(b) by 688 days.

(21) Appl. No.: 12/137,849

(22) Filed: Jun. 12, 2008

(65) Prior Publication Data
US 2009/0309416 A1 Dec. 17, 2009

(51) Int. Cl.
*H01M 10/44* (2006.01)
*H01M 12/06* (2006.01)
(52) U.S. Cl. .................................. 320/101; 429/408
(58) Field of Classification Search .................. 320/101; 429/13, 408
See application file for complete search history.

(56) References Cited

U.S. PATENT DOCUMENTS

| | | | |
|---|---|---|---|
| 2005/0249988 A1* | 11/2005 | Pearson | 429/13 |
| 2007/0065832 A1* | 3/2007 | Stenger et al. | 435/6 |
| 2007/0093280 A1* | 4/2007 | McKay | 455/574 |
| 2007/0097716 A1* | 5/2007 | Clark et al. | 363/39 |
| 2008/0107933 A1* | 5/2008 | Gallagher | 429/17 |

OTHER PUBLICATIONS

Drolia, A., et al., An Approach to Connect Ultracapacitor to Fuel Cell Powered Electric Vehicle and Emulating Fuel Cell Electrical Characteristics using Switching Mode Converter, IEEE (2003).
Gao, W., Performance comparison of a fuel cell-battery hybrid powertrain and a fuel cell-ultracapacitor hybrid power train, IEEE transactions on Vehicular Technology, vol. 54 (2005).
Lewis, F. L., et al., Optimal Control, John Wiley & Sons, Inc. (1995).
Moreno, J., et al., Energy-Management System for a Hybrid Electric Vehicle, Using Ultracapacitors and Neural Networks, IEEE Transactions on Industrial Electronics, vol. 53 No. 2 (2006).
Mucha, J. M., System Control Strategies for a Series Hybrid Electric Vehicle, Master Thesis in Mechanical Engineering, University of Illinois at Urbana-Champaign (2001).

* cited by examiner

*Primary Examiner* — Edward Tso
*Assistant Examiner* — M'Baye Diao
(74) *Attorney, Agent, or Firm* — Kohn & Associates, PLLC

(57) ABSTRACT

A power flow control system including an integrated circuit having a mechanism for determining an amount of energy storage required for power source devices and a mechanism for controlling power flow delivery between the power source devices. A power flow control system also including more than one power source device in electrical connection with the power flow control system. An efficient hybrid vehicle, including the power flow control system integrated in the hybrid vehicle, and more than one power source device in electrical connection with the power flow control system and operatively connected to the hybrid vehicle. A method of controlling power flow in a vehicle, including the steps of determining the amount of energy storage required for power source devices, and controlling power flow delivery between the power source devices. Power flow control systems and methods of using for fuel cell and battery combinations and battery and super-capacitor combinations.

1 Claim, 32 Drawing Sheets

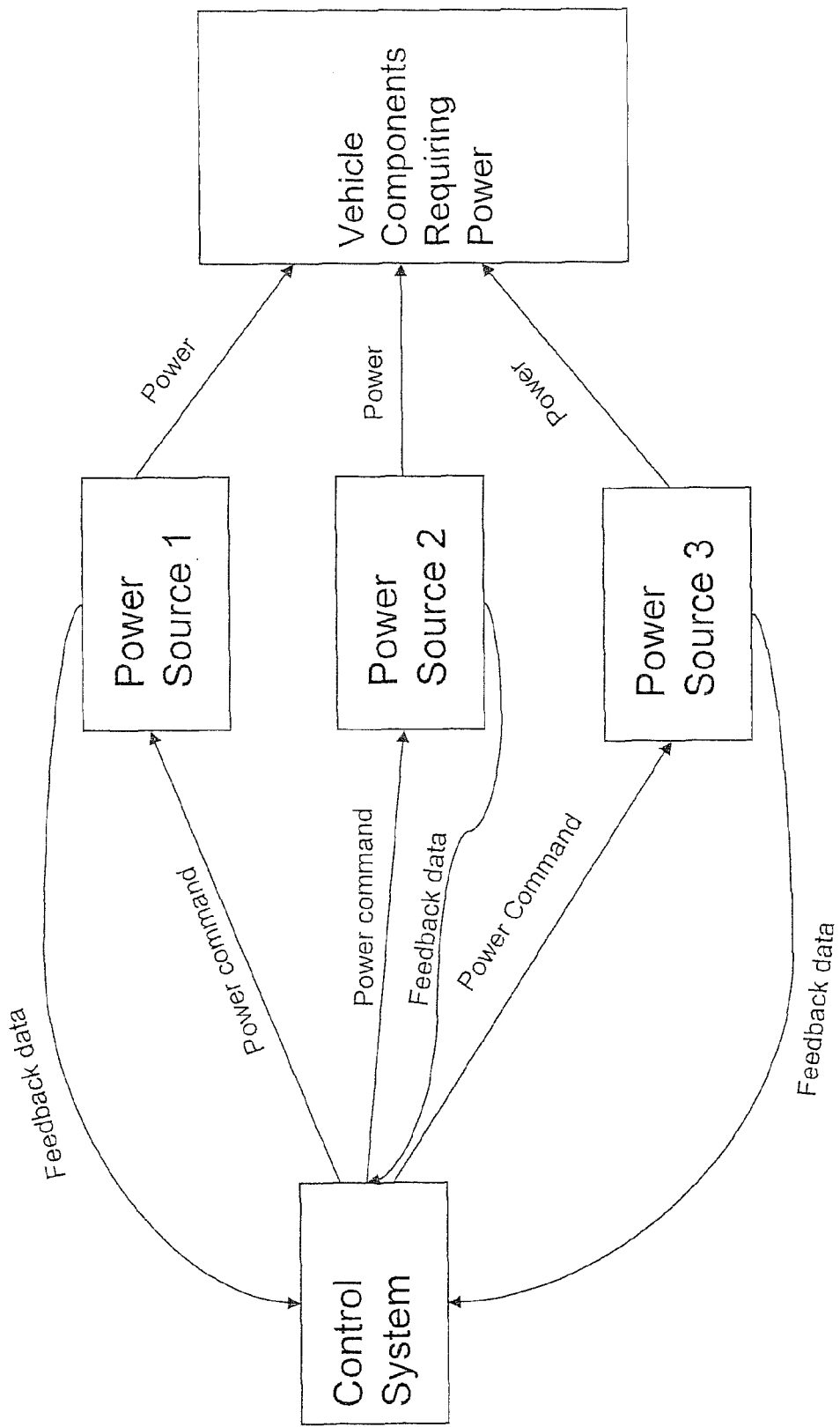

US 8,080,971 B2

ACTIVE ELECTRICAL POWER FLOW CONTROL SYSTEM FOR OPTIMIZATION OF POWER DELIVERY IN ELECTRIC HYBRID VEHICLES

STATEMENT REGARDING FEDERALLY SPONSORED RESEARCH OR DEVELOPMENT

Research in this application was supported in part by a grant from the U.S. Department of Transportation Federal Transit Administration IL-26-7006-01. The Government has certain rights in the invention.

BACKGROUND OF THE INVENTION (1) Field of the Invention

The present invention relates to an electrical power flow control method for hybrid systems. In particular, the present invention relates to the control of electrical power flow in hybrid electric (both plug-in and non plug-in) vehicles.

(2) Description of Related Art

Global warming and the prospect of depleting fossil fuels have motivated many industries to redesign vehicles that utilize alternative energy sources instead of the conventional internal combustion engine. There are several advantages to using alternative energy vehicles, such as reducing emissions in the atmosphere, reducing our dependence on oil both at home and abroad, and reducing cost to the user because the need to purchase gasoline at rising costs is lessened or eliminated altogether.

Hybrid vehicles use a conventional internal combustion engine along with an electric motor supplied with power through a battery. The battery is continuously recharged by the internal combustion engine, such as with a connection to a generator. Hybrids can operate in one of two ways. First, a hybrid can operate in a parallel design, wherein an energy conversion unit and electric propulsion system are connected directly to the vehicle's wheels. The internal combustion engine is used for highway driving whereas the electric motor provides added power when an energy boost is needed. Second, a hybrid can operate in a series design, wherein the internal combustion engine is connected to the generator to produce electricity to charge the battery of the electric motor. The electric motor then powers the wheels of the vehicle. Many hybrid vehicles are also able to use regenerative braking to store and convert energy normally lost through braking and deceleration into useful power.

Plug-in vehicles essentially are hybrids with the added advantage of a larger battery and the ability to recharge externally at a power source.

Fuel cell electric vehicles (FCEV) are able to generate their own electricity through the use of hydrogen reacting with oxygen in a fuel cell, and the electricity can be used to charge a battery which in turn powers an electric motor. The hydrogen can be present in the cell or can be converted from another fuel. The hydrogen produced can also be stored within gas tanks in the car. The fuel cell produces average power required to drive the vehicle on highway while batteries and ultra-capacitors provide transient power. FCEVs have virtually no emissions.

Plug-in vehicles and FCEVs are drawing tremendous attention in motor vehicle companies because of their potential in reducing dependence on oil and impact on the environment. However, both systems have major disadvantages. Plug-in vehicles have limitations on distance coverage, and fuel cells are very expensive, preventing widespread utilization in vehicles.

There is a need for better utilization of the existing energy sources in FCEVs by taking advantage of the unique charging/discharging properties of each source to maximize its capacities. The present invention accomplishes this through a systematic method of establishing component values and determining power distribution.

BRIEF SUMMARY OF THE INVENTION

The present invention provides for a power flow control system including an integrated circuit having a mechanism for determining an amount of energy storage required for power source devices and a mechanism for controlling power flow delivery between the power source devices.

The present invention further provides for the power flow control system as above also including more than one power source device in electrical connection with the power flow control system.

The present invention provides for an efficient hybrid vehicle, including the power flow control system as above integrated in the hybrid vehicle, and more than one power source device in electrical connection with the power flow control system and operatively connected to the hybrid vehicle.

The present invention also provides for a method of controlling power flow in a vehicle, including the steps of determining the amount of energy storage required for power source devices, and controlling power flow delivery between the power source devices.

BRIEF DESCRIPTION OF THE SEVERAL VIEWS OF THE DRAWINGS

Other advantages of the present invention will be readily appreciated as the same becomes better understood by reference to the following detailed description when considered in connection with the accompanying drawings wherein:

FIG. 1A is a block diagram the general invention and FIG. 1B is a block diagram of the fuel cell, battery, and super-capacitor hybrid vehicle power system configuration;

DETAILED DESCRIPTION OF THE INVENTION

Figure 1B:
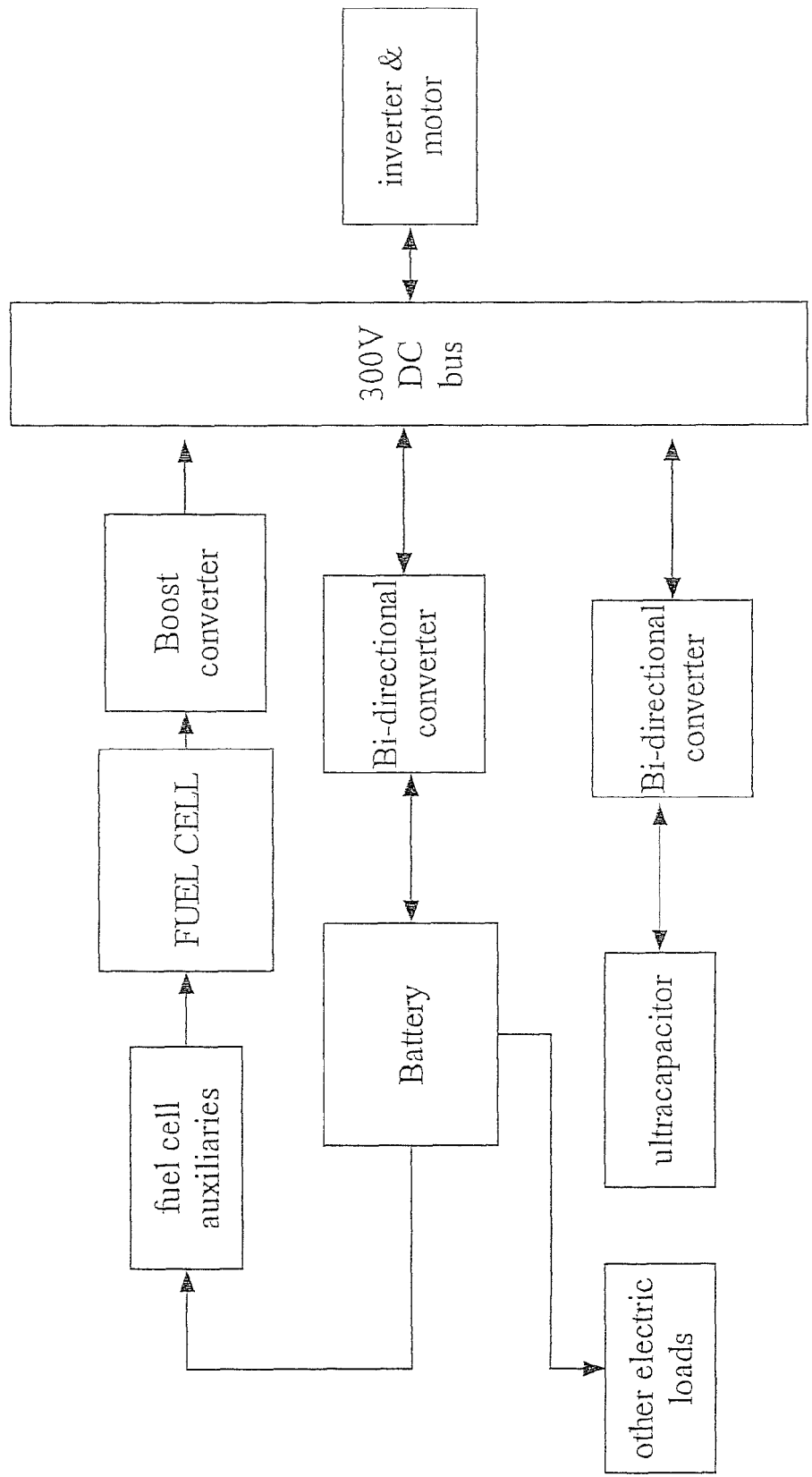

The present invention provides for an electrical power flow control system including an integrated circuit. The integrated circuit includes means for determining an amount of energy storage required for power source devices and means for controlling power flow delivery between the power source devices. The power flow control system is preferably based around the multiple energy storage devices in an electric hybrid fuel cell vehicle (FCEV), as described in the Examples below.

The present invention is shown generally in FIG. 1A. The control system sends a power command to various power source devices. These power source devices provide power to various components of a vehicle. The power command causes the power source devices to provide different amounts of power at different times. The power source devices also send back data (feedback) to the control system, so that the control system can adjust the next power command As used herein, "hybrid" is defined as utilizing multiple power source devices, such as, but not limited to, plug-in and non plug-in devices, standard battery, capacitors, and fuel cells. The capacitor can be any type of capacitor such as, but not limited to, super-capacitors. The fuel cell can also be any suitable type of fuel cell. The invention does not include internal combustion engine as one of the devices. Any combination of the power source devices can be used.

Therefore, the present invention further provides for the power flow control system as described herein also including more than one power source device in electrical connection with the power flow control system.

The present invention provides for power flow control of specific devices as described herein. In other words, the present invention includes a power flow control system for all of the power source devices in a hybrid, but also includes a power flow control system for individual combinations of devices in the overall hybrid system. For example, the present invention provides for a power flow control system for a fuel cell and battery combination including an integrated circuit having means for determining an amount of energy storage required for a fuel cell and battery combination and means for controlling power flow delivery between the fuel cell and battery. Preferably, the means for controlling is an algorithm including Equations 1-24, as further described in the Examples. The present invention also provides for a power flow control system for a battery and super-capacitor combination including an integrated circuit having means for determining an amount of energy storage required for a battery and super-capacitor combination and means for controlling power flow delivery between the battery and super-capacitor. Preferably, the means for controlling is an algorithm including Equations 26-40, as further described in the Examples.

The invention controls any fuel cell/battery, battery/super-capacitor, or fuel cell/battery/super-capacitor hybrid electric vehicle. It solves the problem of distributing the power requirement among all energy storage systems. It can be used in any isolated power system with a limited number of energy sources. The hybrid powered vehicle can be, but is not limited to, golf carts, motorbikes, snowmobiles, motorboats, and jet skis.

Therefore, the present invention provides for an efficient hybrid vehicle, including the power flow control system as described herein integrated in the hybrid vehicle, and more than one power source device in electrical connection with the power flow control system and operatively connected to the hybrid vehicle.

The control system consists of two parts; 1) means for determining the amount of energy storage required for each of the devices and 2) means for controlling power flow delivery between the devices. When the size of the energy storage systems is decided, a new method of controlling the power flow is proposed based upon optimal control techniques. Algorithms are provided for each of these two parts.

In general, Equations 1-40 describe the entire system, with Equations 1-24 being specific to the fuel cell/battery combination and Equations 26-40 being specific to the battery/super-capacitor combination. The algorithm is based on the state of the battery as described in Equation 1 below. The performance index used is described in Equation 2 below. The power command sequence for the fuel cell is described in Equations 3-23 below. The resultant system is described in Equation 24 below. A method for updating the performance index weights is described in Equation 25 below. The method of determining the power command for the battery and super-capacitor is described in Equations 26-40 below. The algorithm was verified using a simulation described in Equations 41-54 below.

In choosing the energy sources, the fuel cell, battery, and ultra-capacitor are matched to the power and energy requirements of the vehicle. The amount of energy storage required for each power source device is determined via mathematical linear programming methods used to optimize the components based on weight, size, and cost constraints.

A real-time optimized power delivery by each energy source device for total vehicle performance and energy efficiency occurs through a program control board. Control software accounts for driving and driver conditions as well as individual power source device power fluctuations. The control software is based on an optimal control theory which optimizes a path for a future goal and is therefore predictive in nature. The control of power flow is achieved through an algorithm that minimizes performance index.

The optimization of power flow uses the battery's current state of charge, desired battery state of charge at the end of the cycle, and average power flow as optimization parameters in the cost equation. By implementing this technique, a set of algorithms consisting of feedforward and feedback gains is developed. These algorithms are used to control and distribute adequate power from the available sources depending on the energy demands. Such a controlling process will find a balance, so that not only hydrogen cost is minimized, but also all energy storage systems are kept within their individual best working capacities.

Thus, the present invention provides for a method of controlling power flow in a vehicle, including the steps of determining the amount of energy storage required for power source devices, and controlling power flow delivery between the power source devices. The present invention also provides for methods of controlling the power flow in the component combinations of a fuel cell and battery, as well as a battery and super-capacitor, as described in the Examples below. Power flow is controlled between a fuel cell and battery by determining the amount of energy storage required for the fuel cell and battery, and controlling power flow delivery between the fuel cell and battery. Preferably, control is achieved by solving an algorithm based on Equations 1-24 which are specific to the fuel cell/battery combination. Power flow is controlled between a battery and super-capacitor by determining the amount of energy storage required for the battery and super-capacitor, and controlling power flow delivery between the battery and super-capacitor. Preferably, control is achieved by solving an algorithm based on Equations 26-40 which are specific to the battery/super-capacitor combination.

The present invention matches a fuel cell with a battery and an ultra-capacitor to obtain a highly efficient system. Through optimal control theory, an active power flow control strategy is designed and effectuated that effectively utilizes each energy source. Using this control strategy, the present invention is able to maintain close to a 60% battery charge capacity during a five hour driving period. The methodology saves 46% energy in long city driving cycle and about 7% energy in highway driving compared to similar power systems using simple on-off hysteresis controls. Furthermore, if a driver occasionally forgets to recharge the battery through plug-in, the battery can re-energize during the driving cycle. These data are shown in the Examples below.

This control strategy is based on mathematical theory described below. All present technology in controlling a fuel cell or battery are based on system internal characteristics, but none of them are formed by using the described mathematics before. The advantage of this technique is that the controller not only can meet the power requirement of the vehicle, but can seek a balance among different objectives. Typical objectives include keeping either system working in a most efficient range or minimizing the energy cost, among other objectives.

One limitation is that the feedforward controller needs knowledge of future driving requirements to determine the command signals. This limitation is handled by predicting ahead for small time intervals and determining the controls for those intervals.

Although the system can apply to variations of different energy sources, the particular application was developed for a system consisting of a fuel cell, battery, and super-capacitor as described in the Examples below. A block diagram of this system is shown in FIG. 1B.

After determining the energy storage requirements, the Examples below follow several specific steps. First, the power requirements are determined based on the operating conditions and desired speed. Based on the battery state, an optimal control algorithm uses the performance index to determine the required power command from the fuel cell. During this process a feedback gain sequence and a feedforward gain sequence is created. The feedback gain is used to feedback information about the battery state to the power command for the fuel cell. The feedforward gain is used to include information from an optimal control sequence into the fuel cell power command. The remaining power not supplied by the fuel cell is divided between the fuel cell and super-capacitor using a second algorithm. This second algorithm includes protections to keep the devices from becoming overly discharged.

The invention is further described in detail by reference to the following experimental examples. These examples are provided for the purpose of illustration only, and are not intended to be limiting unless otherwise specified. Thus, the present invention should in no way be construed as being limited to the following examples, but rather, be construed to encompass any and all variations which become evident as a result of the teaching provided herein.

EXAMPLE 1

Energy Storage Determination

The first part of the invention is the determination of the energy storage requirements for each of the energy storage devices in the system. The determination was done in a way to meet the total system energy and power requirements while minimizing some objective function. This is done using the Simplex algorithm in linear programming. The result of energy storage system design is shown in Table I.

TABLE I

| Vehicle energy storage systems design results | |
| --- | --- |
| NIMH Battery Mass (kg) | 24.1 |
| Super-capacitor Mass (kg) | 24 |
| Hydrogen Mass (kg) | 90 |
| Fuel cell Mass (kg) | 217 |
| Battery Total Energy (kW · h) | 1.33 |
| Battery Peak Power (kW) | 24.1 |
| Super-capacitor Total Energy (W · h) | 96 |
| Super-capacitor Peak Power (kW) | 84 |
| Hydrogen Total Energy (kW · h) | 135 |
| Fuel cell Peak Power (kW) | 48 |
| Vehicle Energy (kW · h) | 136.3 |
| Vehicle Peak Power (kW) | 156 |
| Vehicle Average Power (kW) | 72.1 |
| Energy System Mass (kg) | 355.1 |
| Energy System Cost ($) | 8810 |
| Energy System Volume (L) | 355.8 |

Optimal Power Control

The main part of the invention is the control of power flow between the various energy storage device sources. For a vehicle, power requirements are going to vary at different times in the driving cycle. Demands could range from drawing large power from the sources while accelerating up hill to supplying regenerative braking power to the sources when going downhill or braking. Also, power needs to flow between the various energy sources in order to maintain the proper charge on the batteries and capacitors. This component of the invention uses optimal control theory to determine the power flow in the various components. A performance index is determined based on the battery state of charge and the fuel cell power output is determined to minimize this index. The difference between the power demanded by the vehicle and the power supplied by the fuel cell is made up for by an optimized weighting between the battery and super capacitor.

Methodology

1. Fuel Cell Power Optimization

For this invention, the state of the battery is used as the control variable. The state of the battery ($x_k$) is given by $$x_{k+1} = x_k + (\eta_k u_k - \phi_k) E_{ff} \quad (1)$$

Where:

$x_k$ is the state of the battery, SOC*maximum capacity.

$\eta_k$ is the efficiency of the bi-directional converter from fuel cell side to power bus side. The efficiency can be either time varying or a constant.

$\phi_k$ is a series of power requests depending on the driving cycle. It usually takes about 1 to 2 seconds for a fuel cell to respond to a power request. Thus, the state changing of battery and fuel cell is actually 1 or 2 seconds later than the load power request. So the $\phi_k$ here is actually the power request at an earlier time.

$u_k$ is the fuel cell output power to the power bus.

$E_{ff}$ is the battery charging/discharging efficiency which is a nonlinear function of the battery SOC and charging/discharging power.

The performance index to be minimized here for the control system is:

$$J_k = \frac{1}{2} P_k [x_N - 0.8C]^2 + \frac{1}{2} \sum_{k=i}^{N-1} [Q_k (x_k - 0.6C)^2 + R_k * u_k^2] \quad (2)$$

Here:

$J_k$ is the total cost function to be minimized.

$P_k, Q_k, B_k$ are weighting variables.

C is the maximum capacity.

$x_N$ is the final battery state after N sampling points.

$x_k$ is an intermediate point between 0 to T.

One reason for choosing this objective function is that, the final state does not necessarily need to be exactly recovered to a fixed state. It is only needed to ensure that the difference between the actual final state and the reference is small. With this Free-Final-State Control, the system is optimal controlled by a feedback close-loop controller; while the system would be open-loop controlled for a fix-final-state control, which could be quite unstable. (Lewis and Symos, 1995)

The first term in (2):

$$\left( \frac{1}{2} P_k [x_N - 0.8C]^2 \right)$$

represents the importance of the final state to be close to 0.8 C: if the weighting, P is chosen to be very high, then the final state $x_N$, need to be very close to 0.8 C, and vice versa.

In the same way, the second term in (2):

$$\left( \frac{1}{2} \sum_{k=i}^{N-1} Q_k (x_k - 0.6C)^2 \right)$$

represents the importance of the status of intermediate states. Controlling SOC is needed to be close to 60%, thus, the SOC will not change too rapidly from 40% to 80%.

For the third item:

$$\left( \frac{1}{2} \sum_{k=i}^{N-1} R_k * u_k^2 \right),$$

represents the importance of the fuel cell output power magnitude. If R is very large, then it is more important to limit the fuel cell output power.

In summary, first, the system dynamics are given by the physics of the problem (1), while the performance index (2) is what is chosen to achieve the desired system response. Second, to achieve different control objectives, different types of performance indices J are selected. Finally, the optimal control problem is characterized by compromises and trade-offs, with different weighting factors in J resulting in different balances between conformability with performance objectives and magnitude of the required optimal controls.

To solve this problem, begin with the Hamiltonian function:

$$H^k = \frac{1}{2}[Q_k(x_k - 0.6C)^2 + R_k * u_k^2] + \lambda_{k+1}[x_k + (\eta_k u_k - \varphi_k) E_{ff}] \quad (3)$$

Which yields the state and costate equations:

$$x_{k+1} = \frac{\partial H^k}{\partial \lambda_{k+1}} = x_k + (\eta_k u_k - \varphi_k) E_{ff} \quad (4)$$

$$\lambda_k = \frac{\partial H^k}{\partial x_k} = Q_k x_k - 0.6C * Q_k + \lambda_{k+1} \quad (5)$$

and the stationarity condition:

$$0 = \frac{\partial H^k}{\partial u_k} = R_k * u_k + \eta_k * \lambda_{k+1} \quad (6)$$

Solve (6) for $u_k$ $$u_k = \frac{-\eta_k * E_{ff} * \lambda_{k+1}}{R_k} \quad (7)$$

Use (7) to eliminate $u_k$ in (4):

$$x_{k+1} = x_k - \left( \frac{\eta_k^2 * E_{ff} * \lambda_{k+1}}{R_k} + \varphi_k \right) E_{ff} \quad (8)$$

The initial condition is given as $x_1$, which is 0.4 C, and the final state $x_N$ is free around 0.8 C. This means that $x_N$ can be varied in determining the constrained minimum. Hence $dx_N \neq 0$, according to boundary conditions, then it is required that:

$$\lambda_N = \frac{\partial \phi}{\partial x_N} \quad (9)$$

The final state weighting function is $$\phi = \frac{1}{2} P_N (x_N - 0.8C)^2,$$

so that:

$$\lambda_N = P_N(x_N - 0.8\ C) \quad (10)$$

(5) and (8) are rewritten in a state equation form:

$$\begin{bmatrix} x_{k+1} \\ \lambda_k \end{bmatrix} = \begin{bmatrix} 1 & -\dfrac{\eta_k^2 * \mathit{Eff}}{R_k} \\ Q_k & 1 \end{bmatrix} \begin{bmatrix} x_k \\ \lambda_{k+1} \end{bmatrix} + \begin{bmatrix} -\varphi_k * \mathit{Eff} \\ -0.6 C Q_k \end{bmatrix} \quad (11)$$

It can be assumed that (10) is composed of two auxiliary control series, which can be written as:

$$\lambda_k = S_k x_k - v_k \quad (12)$$

Where $S_k$ and $v_k$ are both unknown sequences, this is a valid assumption if a continuous relationship is found.

Use (12) in (11) to substitute $\lambda_k$, after simplifying the equation becomes:

$$x_{k+1} = x_k - (\eta_k^{2} * \mathit{Eff} * S_{k+1}/R_k) x_{k+1} + \eta_k^{2} * \mathit{Eff} * v_{k+1}/R_k - \varphi_k * \mathit{Eff} \quad (13)$$

The costate equation (5) is rewritten:

$$\lambda_k = \frac{\partial H^k}{\partial x_k} = Q_k x_k - 0.6 C * Q_k + \lambda_{k+1} \quad (14)$$

Put (12) into (14):

$$S_k x_k - v_k = [x_k - 0.6\ C] * Q_k + S_{k+1} * x_{k+1} - v_{k+1} \quad (15)$$

Replacing $x_{k+1}$ with (13) and simplifying gives:

$$\left[ Q_k + S_{k+1} * \frac{1}{1 + \eta_k^2 * \mathit{Eff} * \dfrac{S_{k+1}}{R_k}} - S_k \right] * x_k + $$

$$\left[ -0.6 C * Q_k + S_{k+1} * \frac{\eta_k^2 * \mathit{Eff} * v_{k+1}/R_k - \varphi_k * \mathit{Eff}}{1 + \eta_k^2 * \mathit{Eff} * S_{k+1}/R_k} - v_{k+1} + v_k \right] = 0 \quad (16)$$

Since this equation holds for all $x_k$, the bracketed terms turn out to be zero. Separating out each term gives the following result $$S_k = Q_k + S_{k+1} * \frac{1}{1 + \eta^2 * S_{k+1}/R_k} \quad (17)$$

$$v_k = 0.6 C * Q_k - S_{k+1} * \frac{\eta^2 * v_{k+1}/R_k - \varphi_k}{1 + \eta^2 * S_{k+1}/R_k} + v_{k+1} \quad (18)$$

The boundary conditions are found by looking at the Nth step in (12) and relating like terms to (10). This gives $$S_N = P_N$$

$$v_N = 0.8\ C * P_N \quad (19)$$

Repeating (7) here:

$$u_k = \frac{-\eta_k * \lambda_{k+1}}{R_k}$$

And combining it with (1) and (12) gives:

$$u_k = \frac{-\eta_k * \mathit{Eff} * (S_{k+1}[x_k + (\eta_k u_k - \varphi_k) * \mathit{Eff}] - v_{k+1})}{R_k} \quad (20)$$

A feedback gain can be defined as:

$$K_k = \frac{\eta_k * S_{k+1} * \mathit{Eff}}{\eta_k^2 * \mathit{Eff}^2 * S_{k+1} + R_k} \quad (21)$$

And a feedforward gain as:

$$K_k^v = \frac{\eta_k * \mathit{Eff}}{\eta_k^2 * \mathit{Eff}^2 * S_{k+1} + R_k} \quad (22)$$

Where the control is:

$$u_k = -K_k x_k + K_k^v v_{k+1} + \frac{\eta_k * S_{k+1} * \varphi_k * \mathit{Eff}^2}{R_k + \eta_k^2 * S_{k+1} * \mathit{Eff}^2} \quad (23)$$

The system is:

$$X_{k+1} = \quad (24)$$
$$(1 - \eta_k * K_k * \mathit{Eff}) x_k + \eta_k * \mathit{Eff} * K_x^v v_{k+1} - \frac{\varphi_k * R_k * \mathit{Eff}}{R_k + \eta_k^2 * S_{k+1} * \mathit{Eff}^2}$$

For urban or highway driving, it is expected that different control variables "R", "Q" should be used for optimization, The variable "P" is less important than "R" and "Q" since it relates to the battery achieving a specific final state. Since the proposed application is a plug-in hybrid, the final charge can be modified by external variables and therefore has less significance. The value of "P" can, therefore, be set to a constant of value one. Variables "R" and "Q" greatly affect the vehicle behavior. They should be set inversely proportional to each other so that increasing the effect of one decreases the effect of the other.

In designing the feedback and feedforward controller, it seems that future driving situation should be known first. As this is impossible, the driving cycle is divided into short time windows. For each window, the control variables are updated.

It becomes apparent that the optimum length of the averaging window may change based on the driving cycle. Practically speaking, since highway driving usually has more rapid changes in power, its window length can be used in both urban and highway driving.

When the vehicle is starting, the battery will power the fuel cell auxiliaries and provide traction power for a period of the initial window length. Thus a controller with a previously determined R and Q is first used. The vehicle will follow a previously generated control sequence and produce a new R and Q used to update the controller for the next window.

For the new control system, since a vehicle is always started at low speed urban driving, the weighting coefficients are adjusted for urban driving first. If the vehicle is accelerating and needs more power than urban driving, the battery SOC will fall lower than assumed. Thus, the weighting coefficients must be re-adjusted until SOC goes up again. If SOC is higher than expected, the coefficients are again adjusted to limit the fuel cell output power. In this way, the controller coefficients are updated just by observing the battery SOC.

For every window length, R and Q are updated as:

$$r = r \pm |SOC_{ref} - SOC| * Gain * r \quad (25)$$

$$q = 1/r$$

Figure 2:
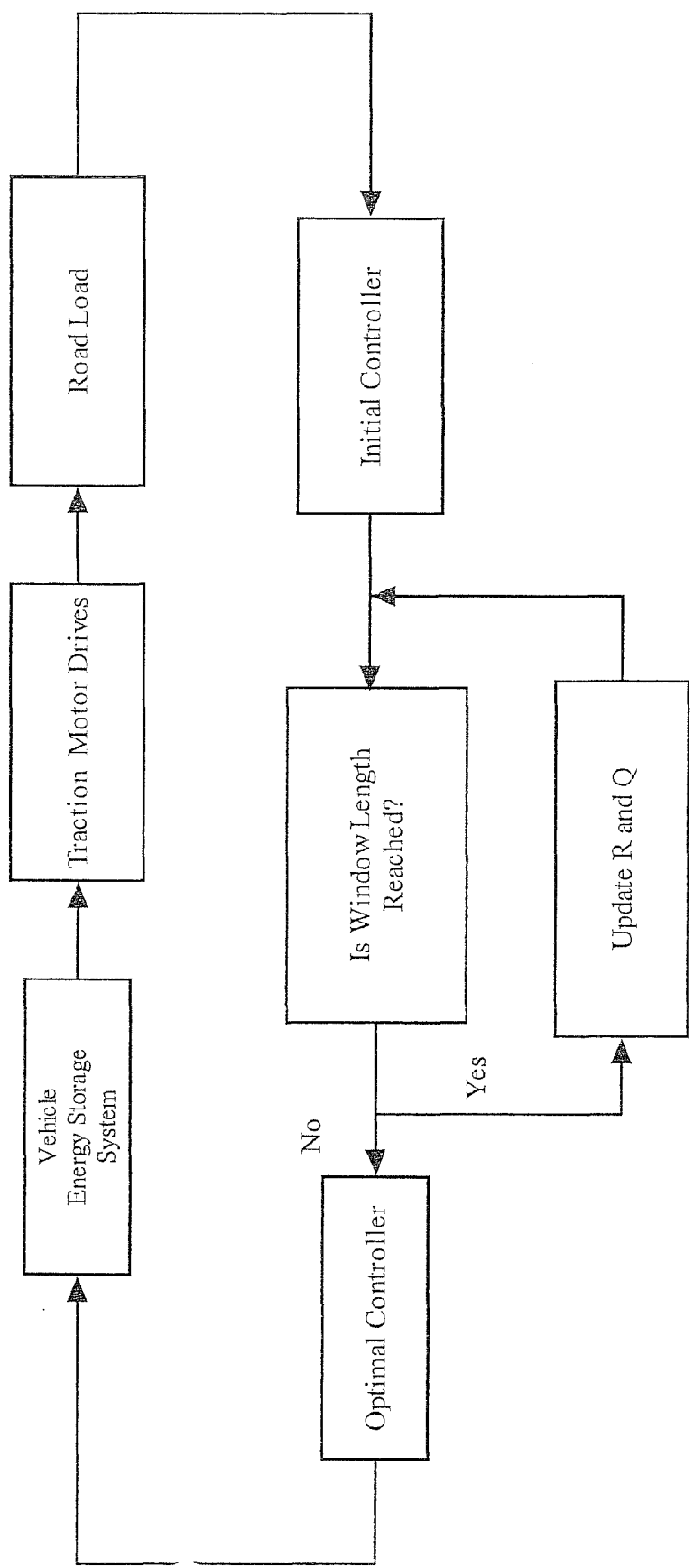
FIG. 2 is a block diagram showing how to update procedures for the fuel cell controller.

$SOC_{ref}$: Reference state of charge (0.6 C)
SOC: Battery state of charge
The process for updating coefficients is shown in FIG. 2.

2. Battery/Super-Capacitor Hybrid Optimization

During a certain driving cycle, the difference of load power and fuel cell output power determines a load current command signal. This signal is split into battery current and super-capacitor current command by the technique introduced here. Remember that the fuel cell power is determined using the optimal control sequence, which is independent of the battery/super-capacitor power split.

For the power split between the battery and super-capacitor, a theoretical optimal control sequence is developed first. The system is described as $$x_k \eta_c + y_k \eta_{bat} = \phi_k \quad (26)$$

Figure 17:
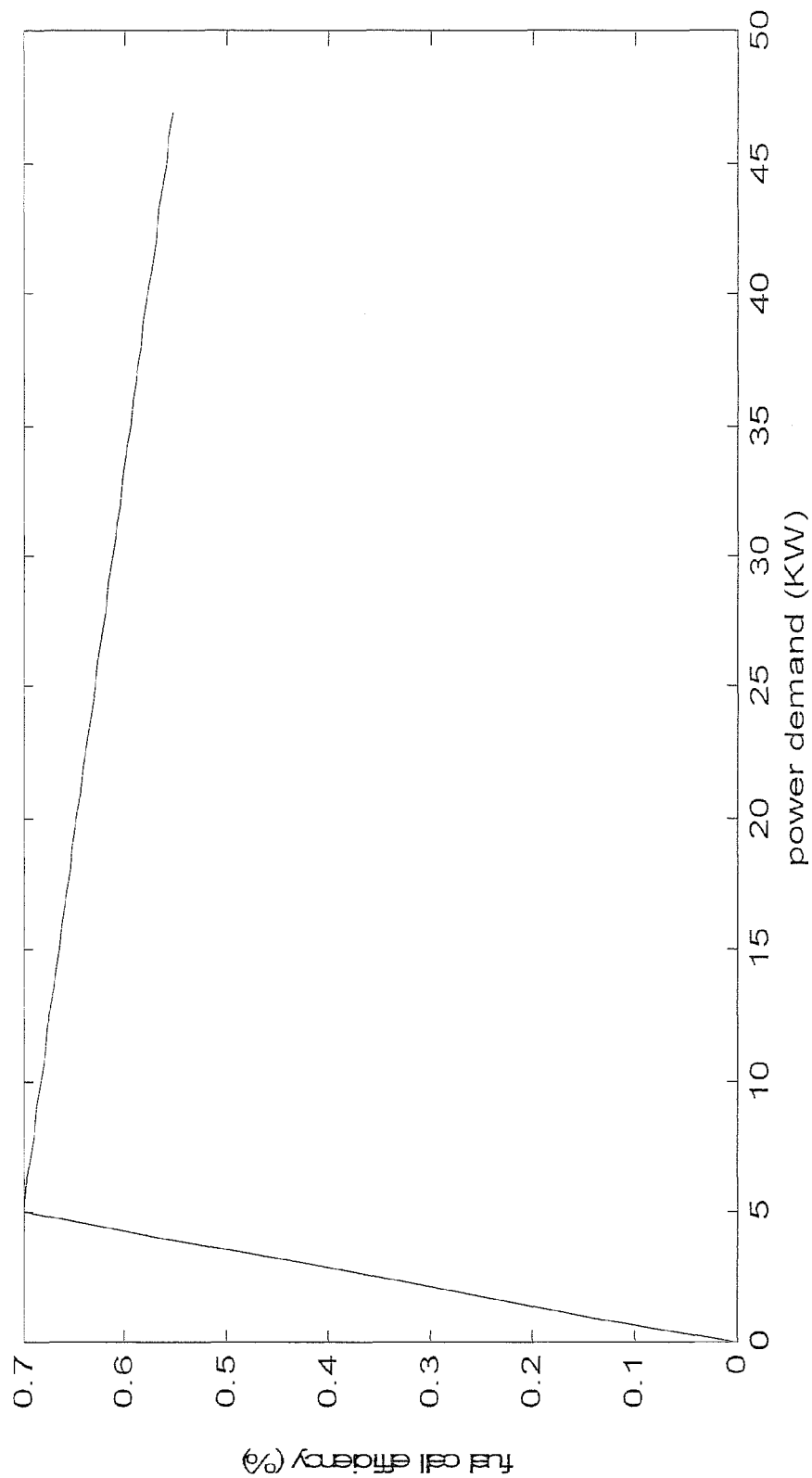
FIG. 17 is a graph of estimated fuel cell efficiency versus power demand.
Figure 18:
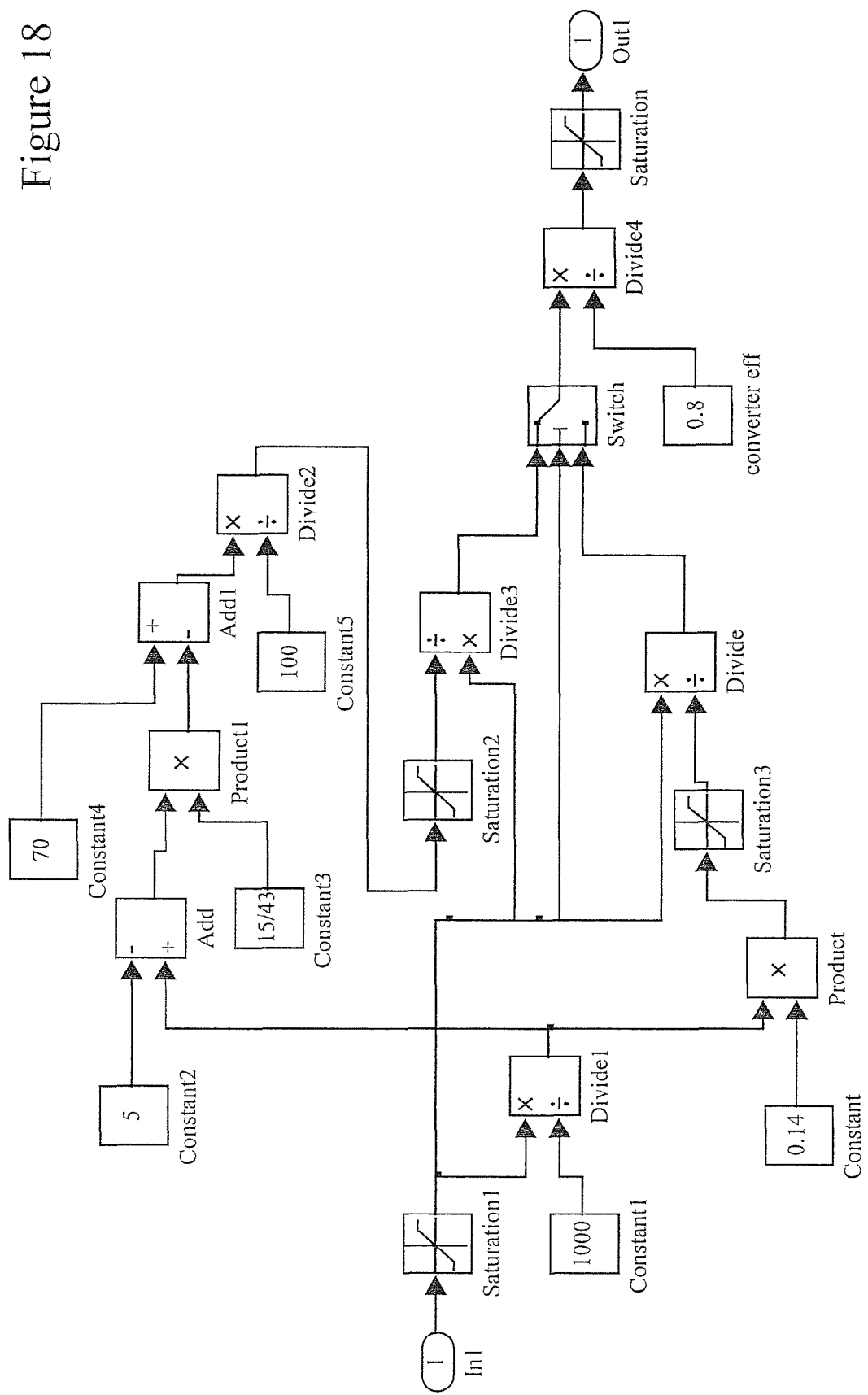
FIG. 18 is block diagram of a fuel cell system.
Figure 19:
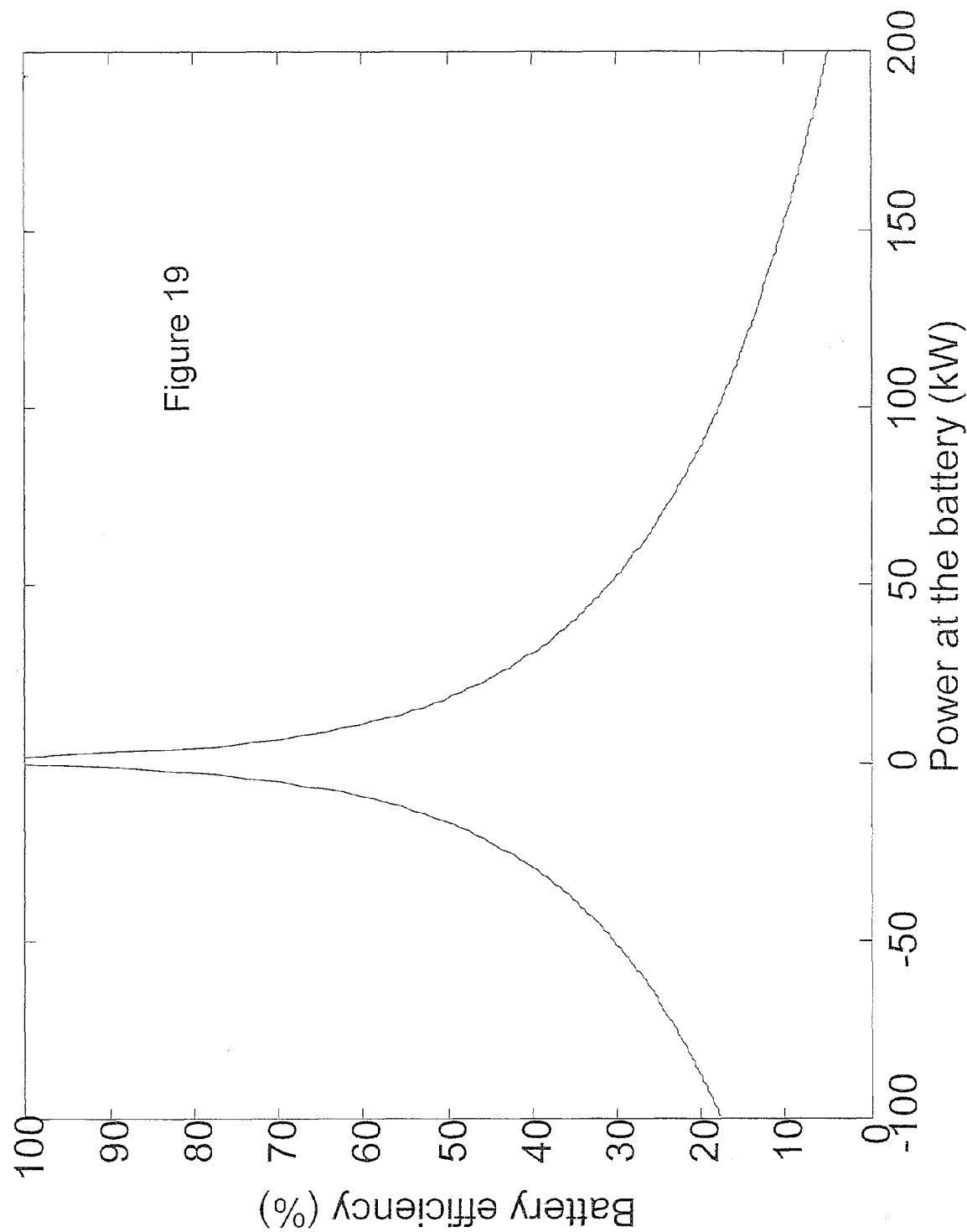
FIG. 19 is a graph of battery efficiency versus power request.

Where
$x_k$: the super-capacitor output power
$y_k$: the battery output power.
$\eta_{bat}, \eta_{cap}$: battery and super-capacitor's converter efficiency, here the efficiencies follow certain curves in FIGS. 19 and 17.
$\phi_k$: power requirement over the whole sampling time, which is the difference between the driving cycle load requirement and the fuel cell control input power.

$$\phi_k = \phi_k - u_k \quad (27)$$

$\phi_k$: load condition

When $\phi_k$ is positive, the energy storage system is discharged, and when $\phi_k$ is negative, the battery/super-capacitor are charged. Note that the power split control is valid for both acceleration and deceleration situations.

The following equation needs to be minimized:

$$J_k = \alpha \sum_{k=i}^{N-1} [(x_k - x_{max})^2 + (y_k - y_{max})^2] + \quad (28)$$

$$\beta \sum_{k=i}^{N-1} (x_k^2) + \gamma \sum_{k=i}^{N-1} (y_k^2) + \delta \sum_{k=i}^{N-1} (\phi_k/\eta - x_k - y_k)^2$$

Where
$\alpha, \beta, \gamma, \delta$: weighting variable.
$x_k$: super-capacitor discharge power at instant k.
$y_k$: battery discharge power at instant k.
$x_{max}$: maximum super-capacitor discharge power
$y_{max}$: maximum battery discharge power The importance of the super-capacitor power being limited is determined by:

$$(x_k - x_{max})^2 \quad (29)$$

which shows the importance of the super-capacitor input or output power being limited. To extend its life, we need to limit $x_{max}$ The importance of the battery power being limited is determined by:

$$(y_k - y_{max})^2 \quad (30)$$

There should be maximum limits on both battery's charging and discharging power as well, in which the minimum is $y_{max}$. This effort is aimed at protection of battery.

The weighting function for the total energy cost is given by:

$$\beta \sum_{k=i}^{N-1} (x_k^2) + \gamma \sum_{k=i}^{N-1} (y_k^2) \quad (31)$$

This function is used to limit the total energy used, if possible.

The tolerance of the difference between the sum of output power and the power request is given by:

$$\delta \sum_{k=i}^{N-1} (\phi_k/\eta - x_k - y_k)^2 \quad (32)$$

This shows the tolerance of the difference between the sum of output power and the power request.

To make the objective function simple, it is assumed that converter efficiencies are the same. Then, $y_k$ can be written in terms of $x_k$ and (28) can be rewritten in an instantaneous form:

$$J_k = \alpha[(x_k - x_{max})^2 + (\phi_k/\eta - (x_k + y_{max}))^2] + \beta x_k^2 + \gamma(\phi_k/\eta - x_k)^2 + \delta(\phi_k/\eta - x_k - y_k)^2 \quad (33)$$

Combining like terms while ignoring the subscript k for simplicity gives:

$$J_k = (2\alpha + \beta + \gamma + \delta)x^2 + (-2\alpha x_{max} - 2\alpha(\phi/\eta) + 2\alpha y_{max} - 2\gamma(\phi/\eta) + 2\delta y - 2\delta(\phi/\eta))x + \alpha x_{max}^2 + \alpha(\phi/\eta)^2 - 2\alpha(\phi/\eta)^2 - 2\alpha(\phi/\eta)y_{max} + \alpha y_{max}^2 + \gamma(\phi/\eta)^2 + \delta y^2 - 2\delta(\phi/\eta)y + \delta(\phi/\eta)^2 \quad (34)$$

Since the first item $(2\alpha+\beta+\gamma+\delta)$ must be larger than zero, the critical or stationary point appears when the increment with respect to dx is zero.

Thus, the local minimum point occurs at:

$$(2\alpha + \beta + \gamma + \delta)x + (-\alpha x_{max} - \alpha(\phi/\eta) + \quad (35)$$
$$\alpha y_{max} - \gamma(\phi/\eta) + \delta y - \delta(\phi/\eta)) = 0 \quad \text{Thus,}$$

$$x = \frac{\alpha x_{max} + \alpha(\phi/\eta) - \alpha y_{max} + \gamma(\phi/\eta) - \delta y + \delta(\phi/\eta)}{(2\alpha + \beta + \gamma + \delta)} \quad (36)$$

So, $$y = \frac{(\alpha + \beta)(\phi/\eta) - \alpha x_{max} + \alpha y_{max}}{(2\alpha + \beta + \gamma)} \quad (37)$$

$$x = \phi/\eta - y$$

The other constraints are:

$$|x| \leq 3500 * 24 \quad (38)$$

$$|y| \leq 1000 * 24.1 \quad (39)$$

If required power x and y exceed the limits of (38) and (39), then this will bring some additional loss due to the overstress on battery or super-capacitor.

This system has not taken into account the battery and super-capacitor capacity. Also the optimal control sequence cannot find a good choice of power split when the optimal result actually exceeds the limits of the input/output power. Therefore, a control logic considering all these effects is needed to be found.

Since there is about constant 1 kW of auxiliary loads on the battery, the minimum load on the battery is 1 kW. For a super-capacitor, its state of charge is given by the energy that can be stored within the capacitor system. It is a function of the capacitor voltage squared:

$$SOC = K * V_c^2 \quad (40)$$

For the proposed system, the K is $1.11 \times 10^{-5}$. It acts as a normalization constant so that the equation yields SOC=0 for no voltage on the capacitor and SOC=1 for the maximum voltage of 300V DC bus. For the DC-DC converter on the super-capacitor side, it is anticipated that a normal wide-input converter can tolerate 2:1 of input variance. Thus, it is needed to maintain super-capacitor output voltage to be higher than 150V, when the corresponding SOC is 25%.

For fuel cells, its turn-on sequence follows the optimal control law described by Equations 1-24. When its power is not required for traction, it is at rest but still operating at a minimum power. This is because re-starting the fuel cell takes some time. The fuel cell is fully turned off only if the key is pulled out.

The power resistor is used when there is incoming regenerative braking energy, but both the battery and super-capacitor are almost fully charged. Thus, to avoid over-charging, the power resistor is used.

For the battery and super-capacitor, when either one's SOC is too low (for battery, the limit is 40%; for super-capacitor, 25%), they will be protected from giving out power. However, if traction power is not enough, they will still be drained.

When either one's SOC is too high (for battery, the limit is 80%; for super-capacitor, 100%), they will be forced to deliver power but never absorb any.

If both SOCs are too low, then they are both protected from discharging. Here only the fuel cell gives power. Either battery or super-capacitor has its priority to receive power depending on their individual SOC comparing to reference SOC. If both SOCs are too high, then they are forbidden to take in any power.

If the incoming power request is too large, then fuel cell could give power more than the optimal results, until the power reaches the 48 kW limit.

Other than these situations, all components give and receive power in an optimal controlled way.

Although the control strategy mentioned here appears to be somewhat complicated, this hybrid system will only require slightly more complicated programming than a simple F/B or B/C hybrid vehicle.

Simulation Model:

A Simulink model is used to study the optimal control strategy for a FCEV, a thermostatic control strategy is compared to verify the benefits of optimal control. A detailed description of the model will be given here. The model inputs are a driving cycle composed of time and speed (there is no grade for these cycles tested). A setup data file contains information that is vehicle-specific such as mass, frontal area, coefficient of drag, coefficient of rolling resistance, gear ratios, motor efficiency, etc. Based on the driving cycle and the particular control strategy chosen, the model calculates the fuel consumption of the vehicle over the course of the drive.

By using Simulink, it is simple to construct dynamic models of systems. Blocks that perform various functions are linked together to compose the model. Some blocks are complete subsystems which perform the calculations pertaining to one aspect of the model. The main blocks of the FCEV simulator are the driving cycle block, the road power block, the traction system block, the optimal controller block, and the energy storage system block. A complete description of each block is given.

Driving Cycle Block

Figure 3:
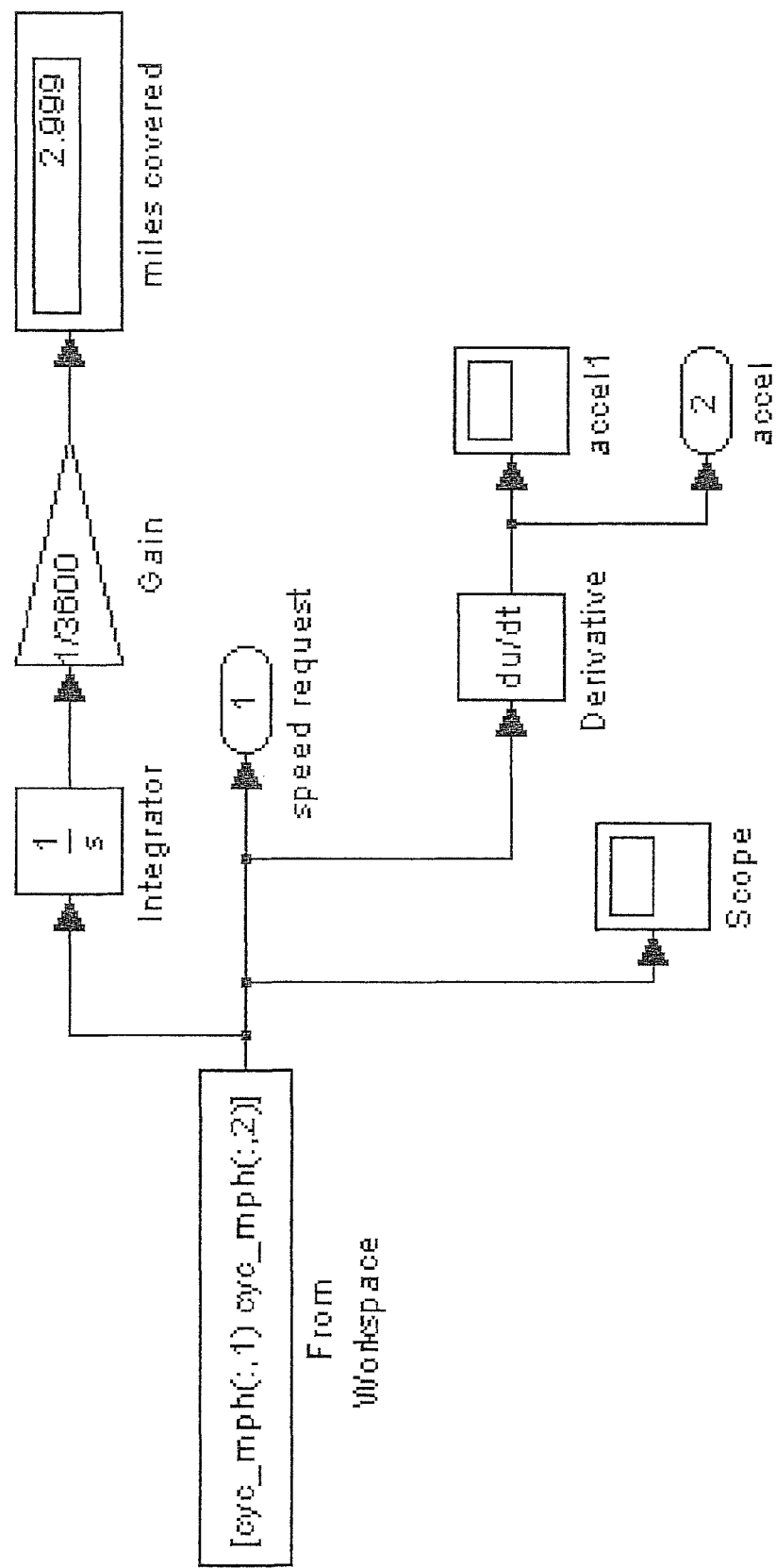
FIG. 3 is a block diagram of a driving cycle.

The driving cycle block, shown in FIG. 3, is the source of input of the driving cycle to the simulator. The driving cycle is composed of a matrix that is fed into the driving cycle block. The matrix contains two vectors: time and vehicle speed (for the driving cycle we tested, there is no grade included). The driving cycle block passes the driving cycle information to the other blocks in the model. It also calculates the total distance traveled by the vehicle's instantaneous acceleration using (41) and (42).

$$\text{Distance} = \int v \, dt \quad (41)$$

$$\text{Acceleration} = \frac{dv}{dt} \quad (42)$$

Figure 4:
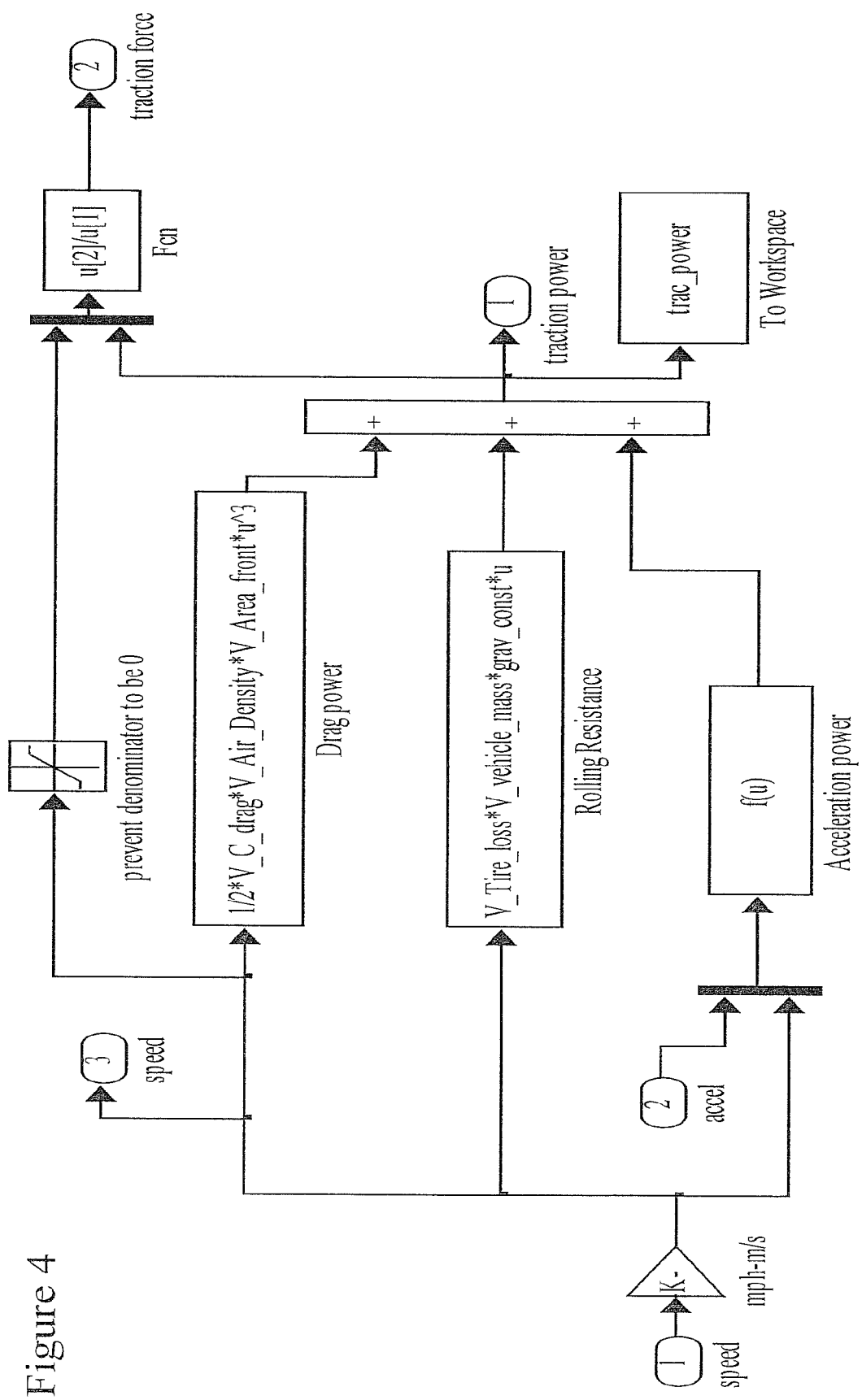
FIG. 4 is a block diagram of road power.

Road Power Block:

The road power block, shown in FIG. 4, receives the vehicle speed as inputs and returns the traction force needed to move the vehicle and the vehicle traction power. A vehicle's traction power is composed of the power needed to overcome the forces on the vehicle opposing its motion. There is the rolling resistance force, aerodynamic force and acceleration force. Total traction power at the wheels is:

$$P_{out} = \left(m * g * f_r + \frac{1}{2}\rho_a C_d A_f V^2 + m * a\right) * V \quad (43)$$

In addition to calculating traction power the road power block also calculates traction force using (44):

$$\text{force} = \frac{\text{power}}{\text{velocity}} \quad (44)$$

Traction System Block

Figure 5:
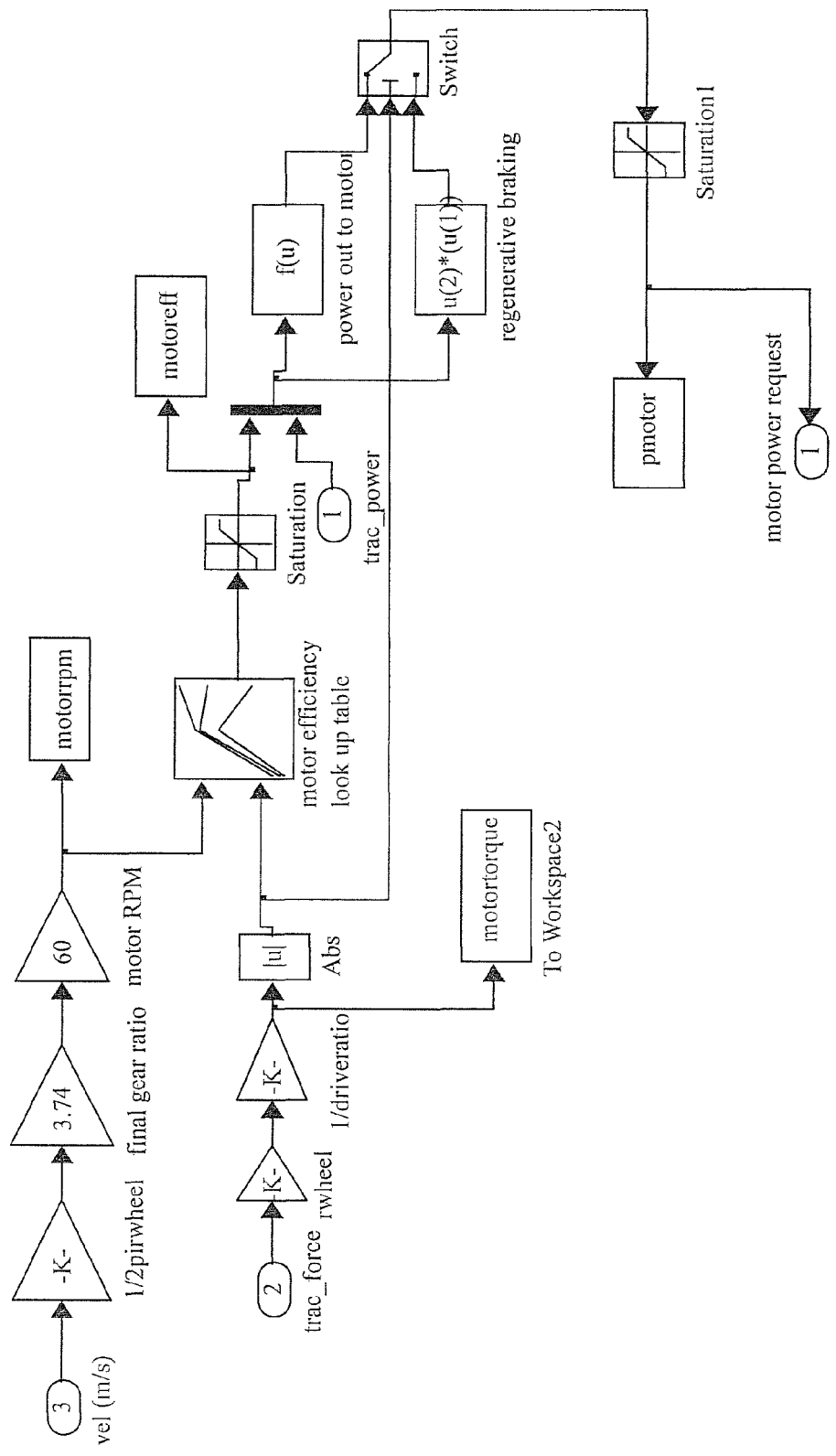
FIG. 5 is a block diagram of a traction system.
Figure 6:
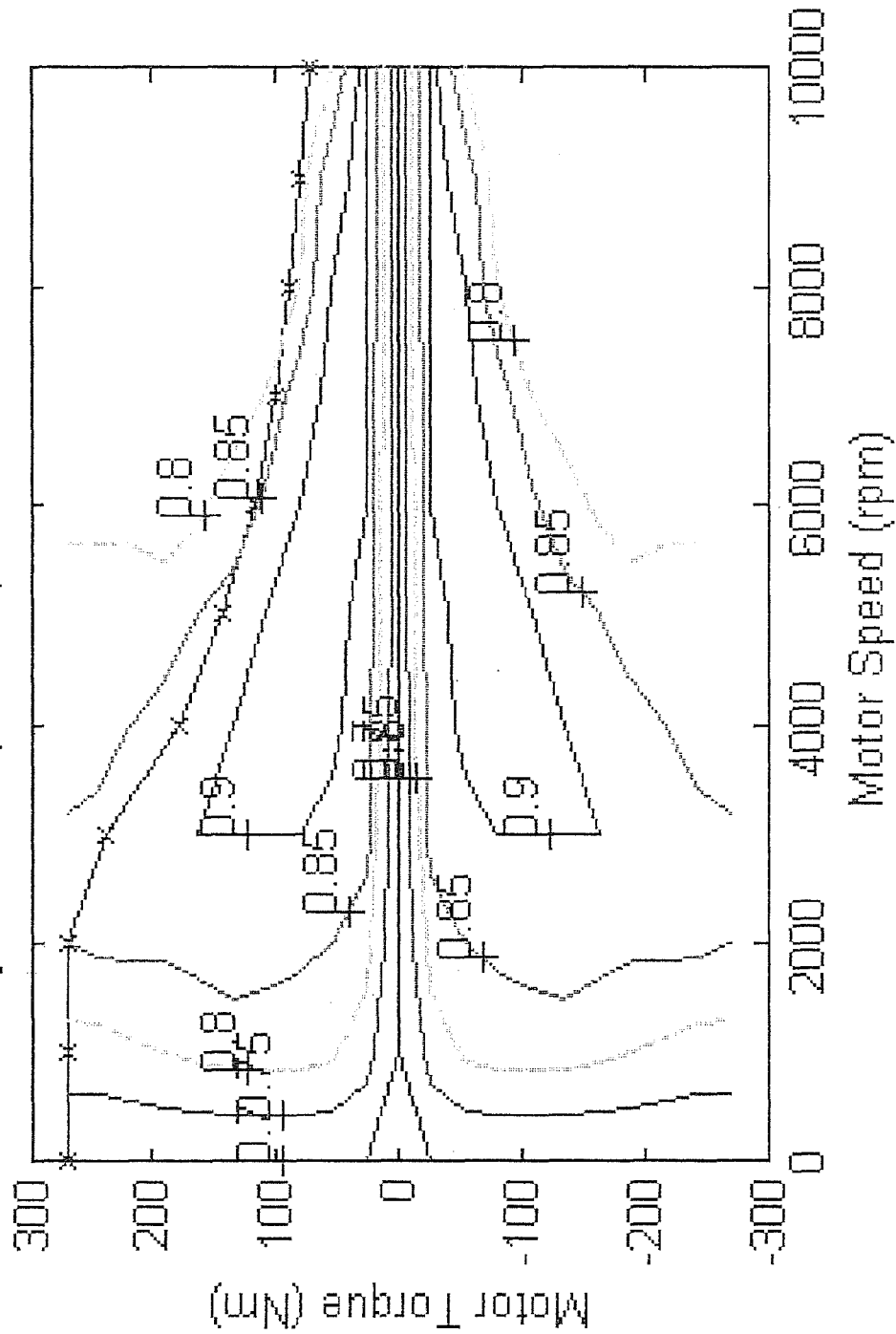
FIG. 6 is a map of AC75 motor efficiency.

The traction system block, shown in FIG. 5, receives the vehicle's traction power, traction force, and velocity as inputs from the road power block. The traction motor's power is the output from the traction system block. Motor speed is calculated using the vehicle's speed and transmission gear ratios. The FCEV model assumes a single speed transmission/differential.

$$RPM_{motor} = (\text{velocity})\left(\frac{1}{2\pi * r_{wheel}}\right)(\text{driveratio})(60) \quad (45)$$

$$T_{motor} = (f_{traction})(r_{wheel})\left(\frac{1}{\text{driveratio}}\right) \quad (46)$$

$$P_{motor} = (P_{traction})(\eta_{motor}); P_{motor} < 0 \quad (47)$$

$$P_{motor} = \frac{P_{traction}}{\eta_{motor}}; P_{motor} > 0 \quad (48)$$

Motor speed is calculated using (45) and motor torque with (46). Using the motor torque and motor speed, the motor's efficiency is determined with a look up table based on the manufacturer's data. In this model, the motor's efficiency is regarded the same regardless of whether the motor is employed as a motor or a generator. A switch is used to determine if a positive or negative torque is being commanded from the motor. A negative torque is commanded during regenerative braking. The total efficiency and power into or out of the motor is determined using (48). The energy system charge and discharge limits are found in energy storage system block. Braking power in excess of limits is delivered using the power resistor. For the vehicle designed, an AC75 motor was used.

Optimal Control Block

Figure 7:
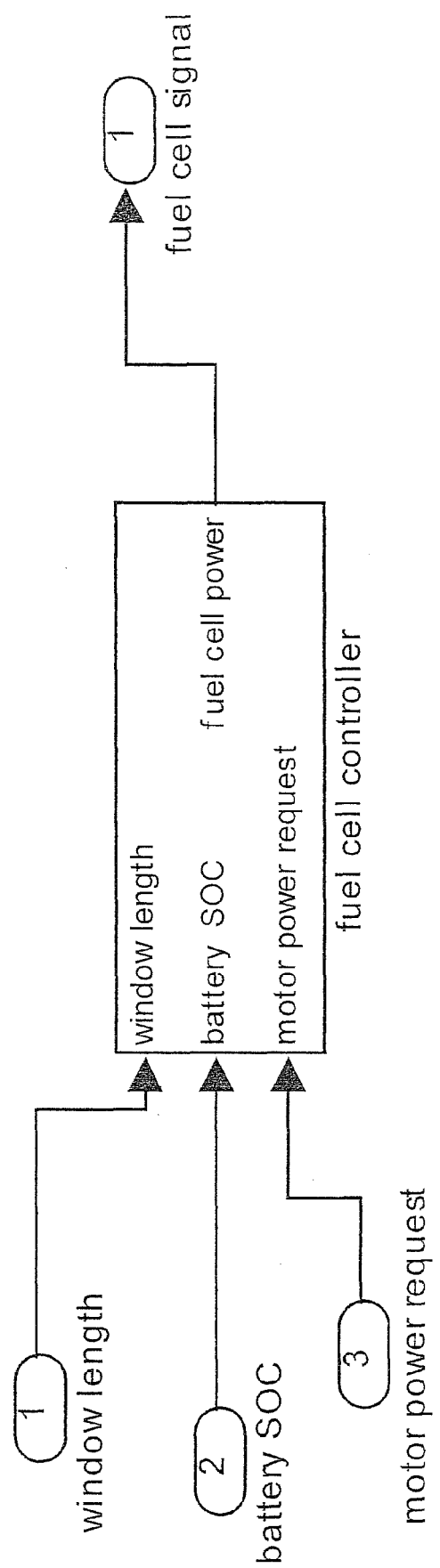
FIG. 7 is a block diagram of a fuel cell controller (outside)

The optimal control block actually integrates two control strategies to compare their behaviors. One can easily switch between the old and new strategies to get fuel cell output power, and the battery/super-capacitor hybrid is controlled by the same power splitting strategy. The optimal control sub block includes the fuel cell controller, as shown in FIG. 7.

Figure 8:
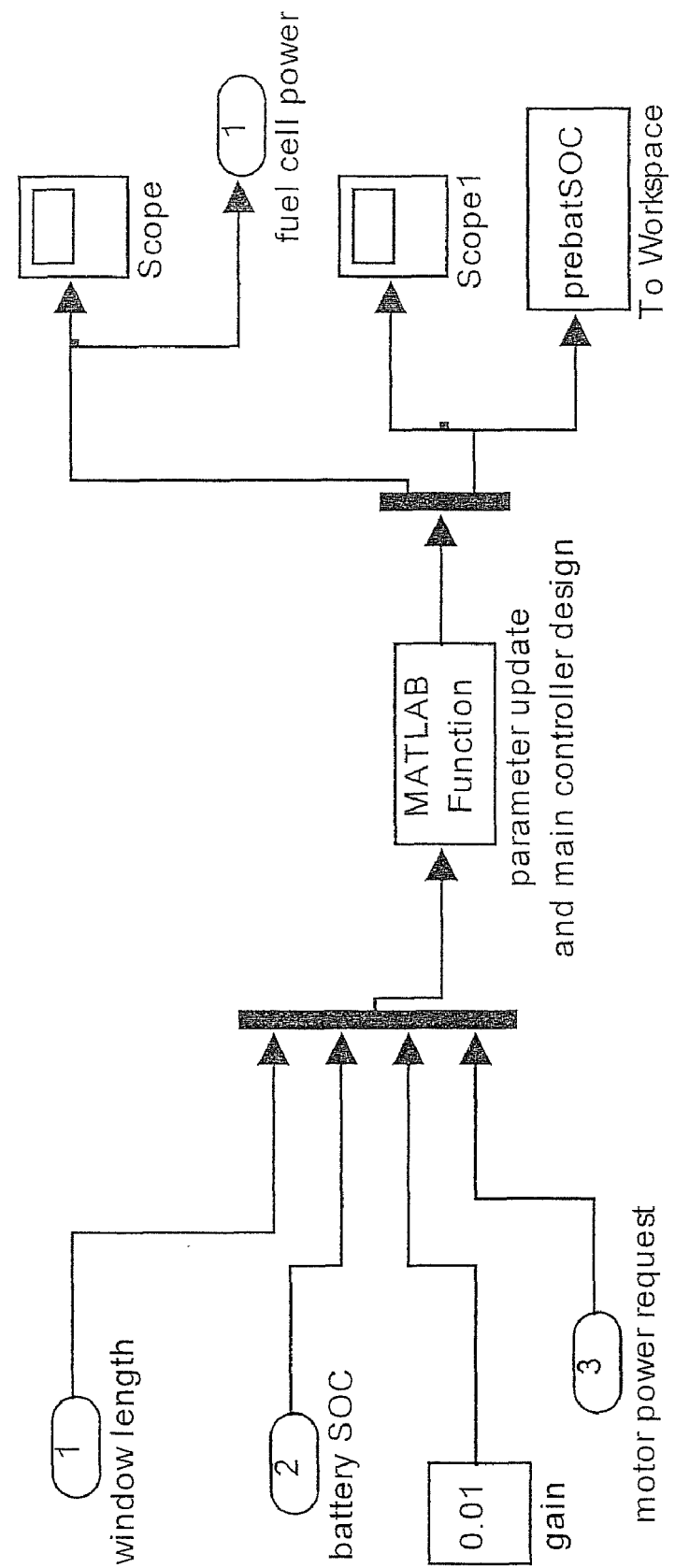
FIG. 8 is a block diagram of a fuel cell controller (inside)

The fuel cell sub-block is shown in FIG. 8. Since the control program is complicated, using a MATLAB function block will be simpler to implement the program. The block will determine the power and energy used by fuel cell during the whole driving cycle.

However, the MATLAB function block is very slow because it calls the MATLAB parser during each integration step, and thus the simulation time can be very long. Since a fuel cell/battery hybrid is supposed to be independent of the battery/super-capacitor hybrid, MATLAB programming can be used to first assume the fuel cell output power outside of the Simulink model. The results will be used as input; input "u" is this fuel cell output power.

Figure 9:
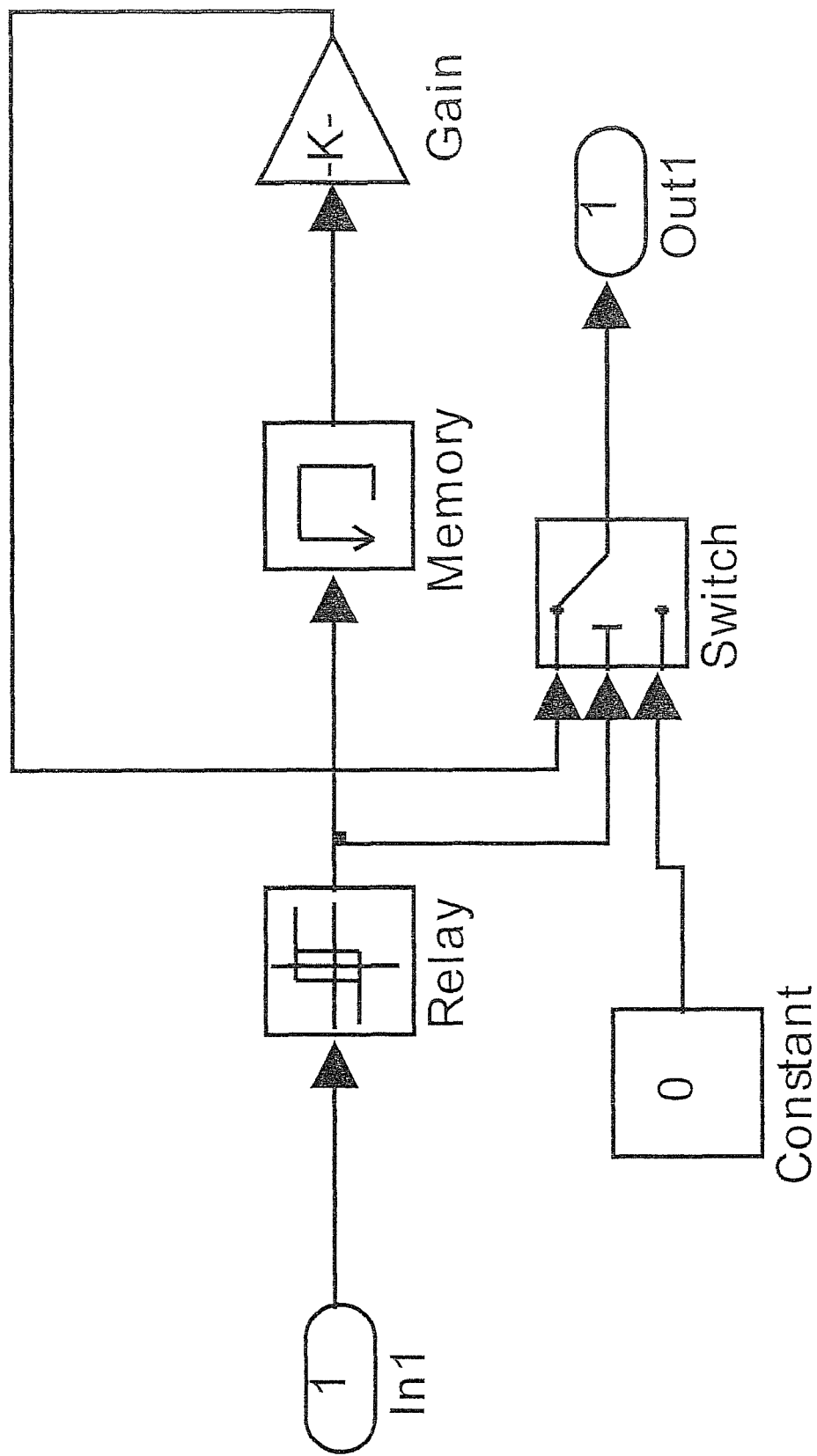
FIG. 9 is a block diagram of a thermostatic control.

FIG. 9 shows the thermostatic control strategy. When the thermostatic strategy is being used, the car operates as an electric vehicle until battery SOC falls down below 40%, then fuel cell is turned on until the battery SOC is recharged to 80%. The fuel cell is then turned off again.

Power Split Controller

Figure 10:
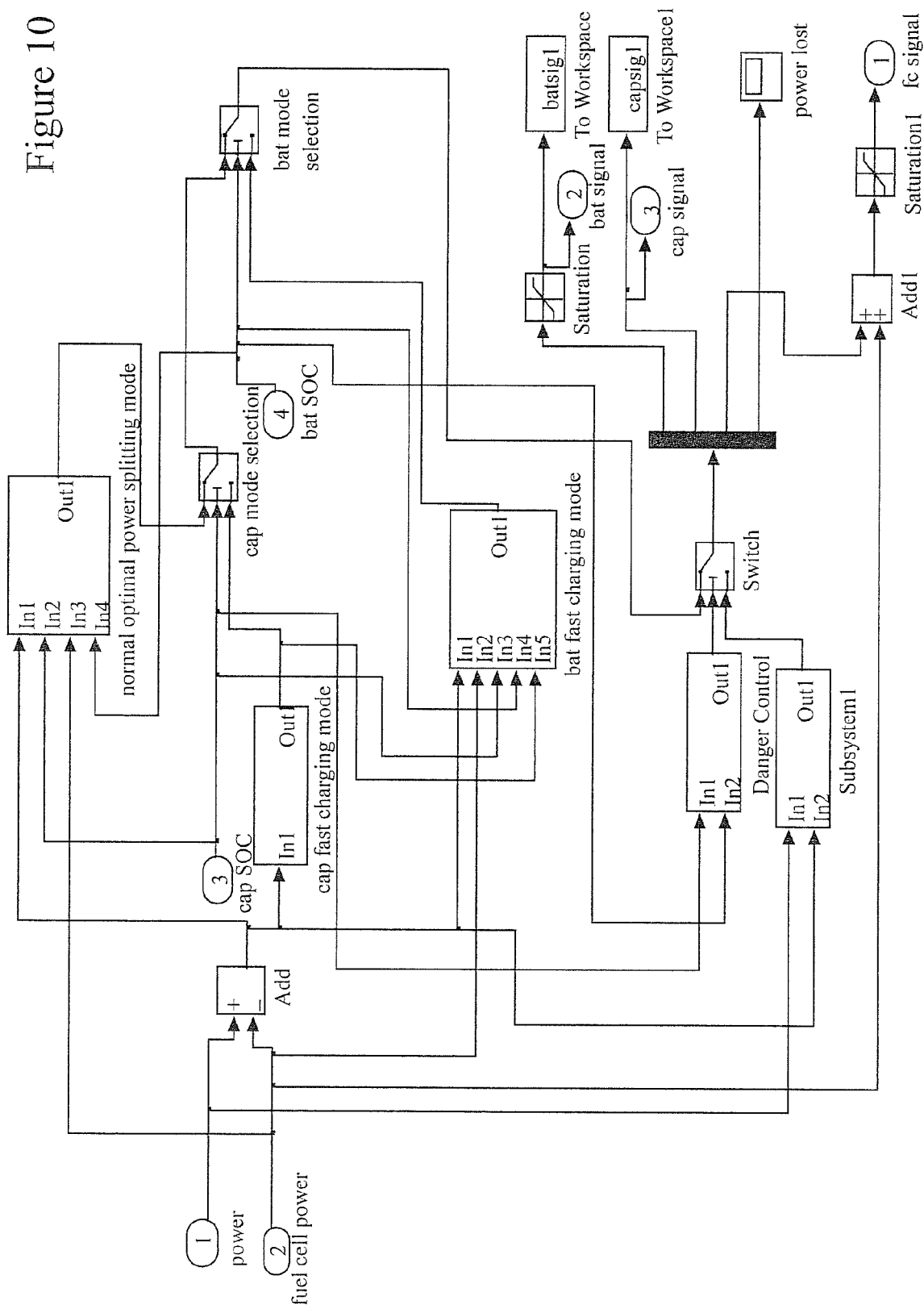
FIG. 10 is a block diagram of a power split controller.
Figure 11:
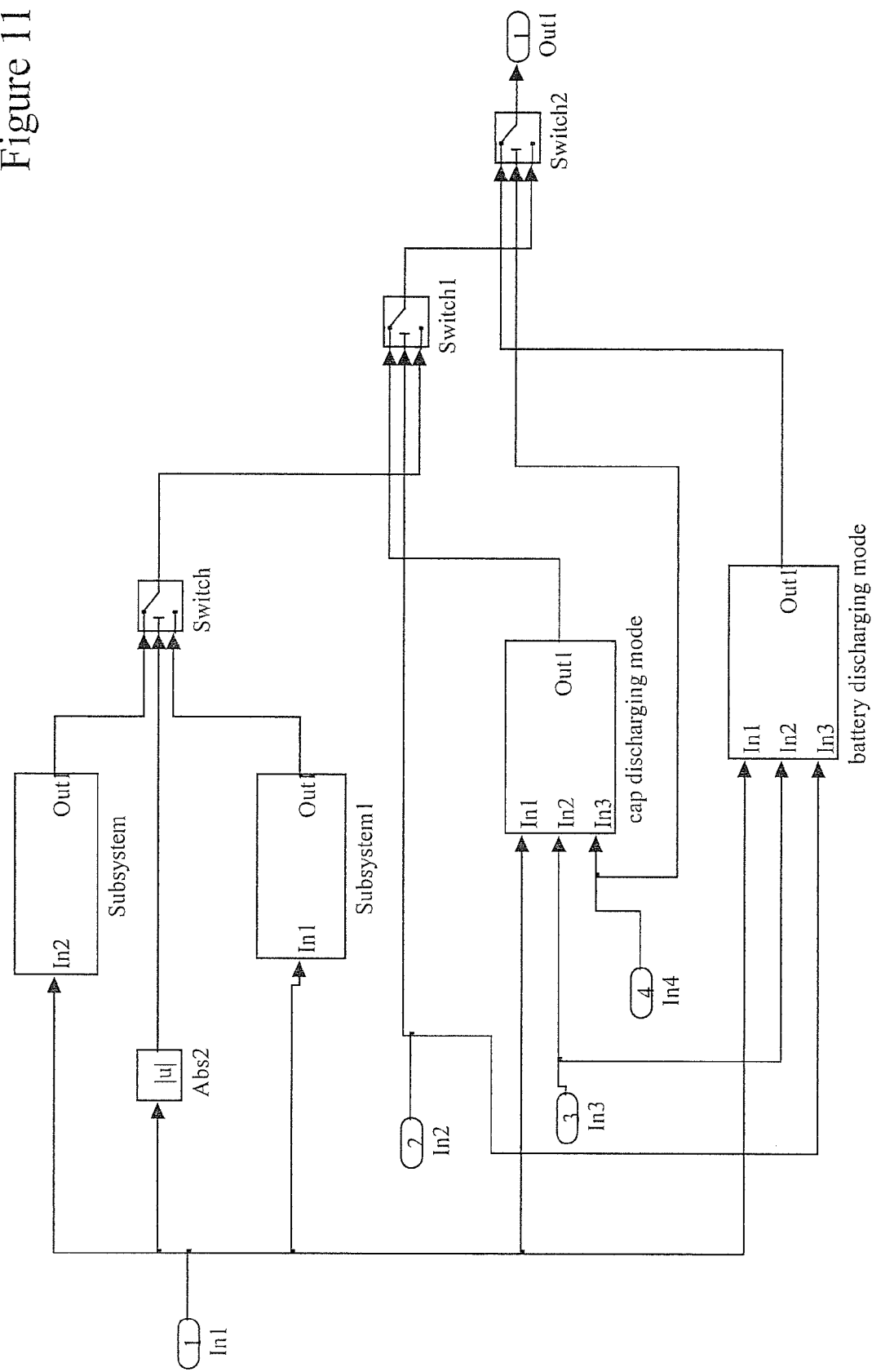
FIG. 11 is a block diagram of normal mode and fast discharging mode.
Figure 12:
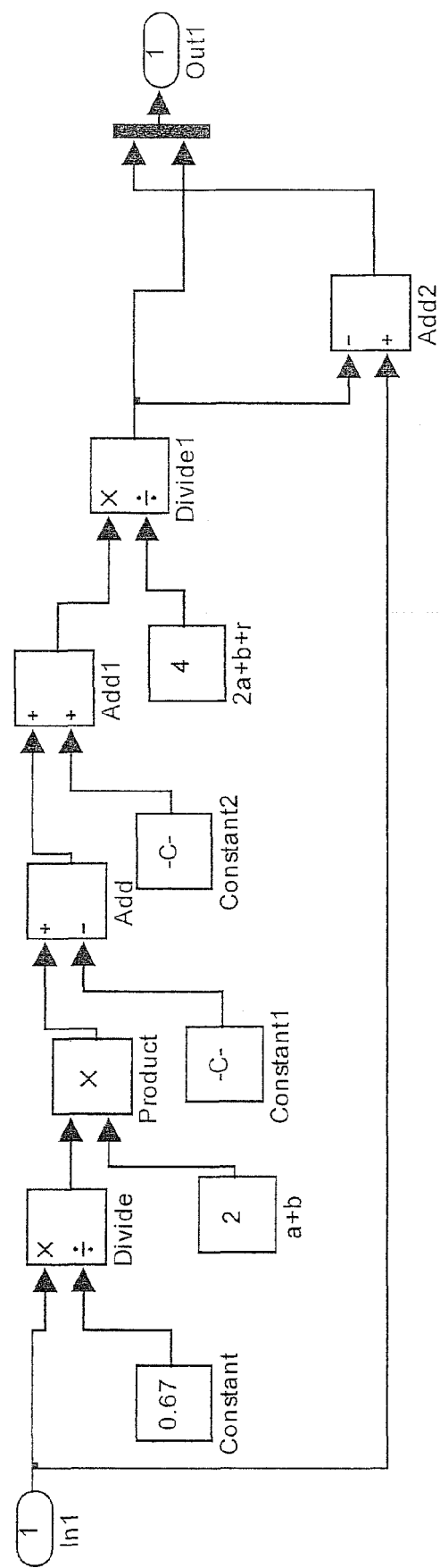
FIG. 12 is a block diagram of optimal control subsystem.
Figure 13:
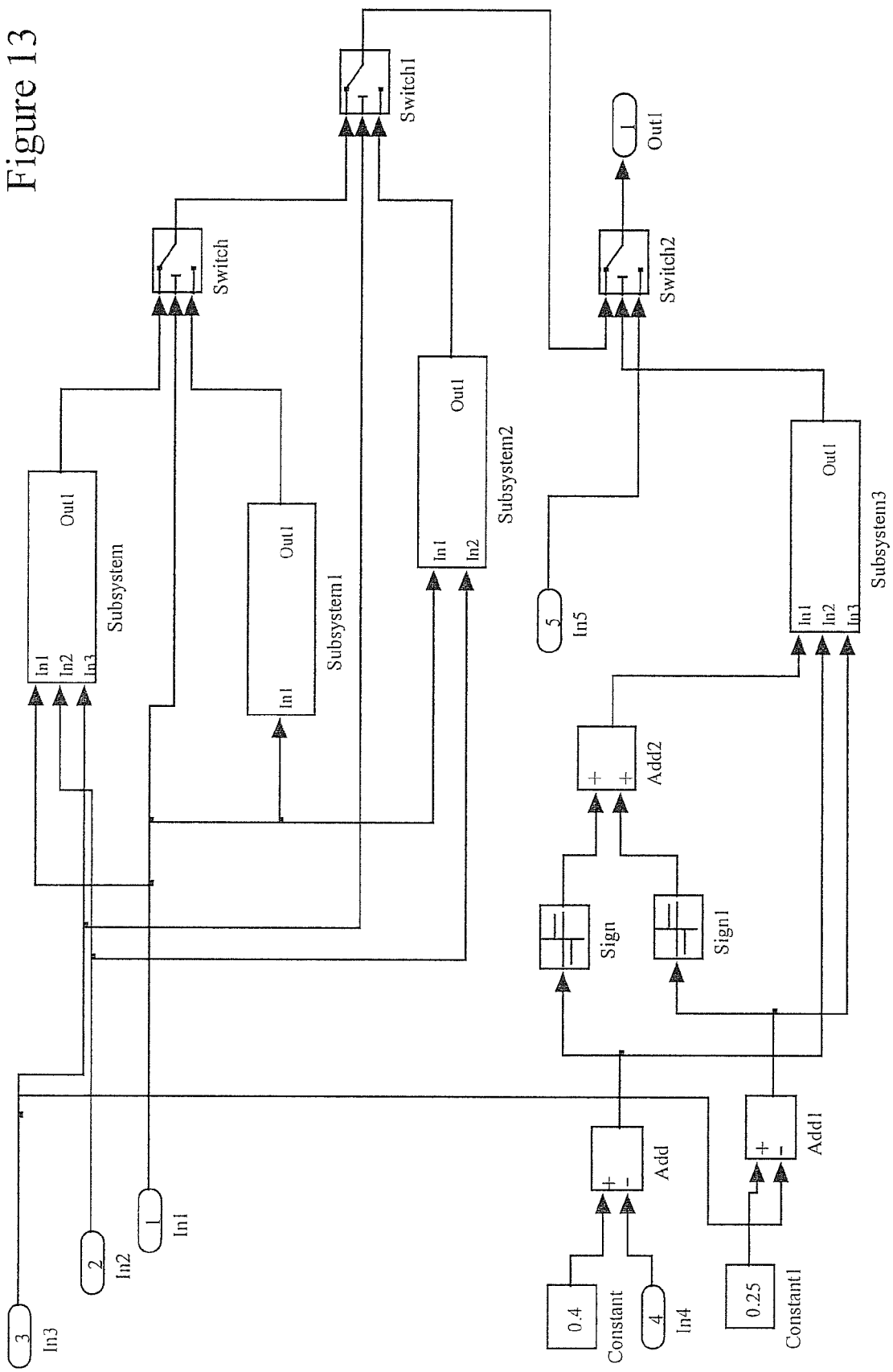
FIG. 13 is a block diagram of battery fast charging mode.
Figure 14:
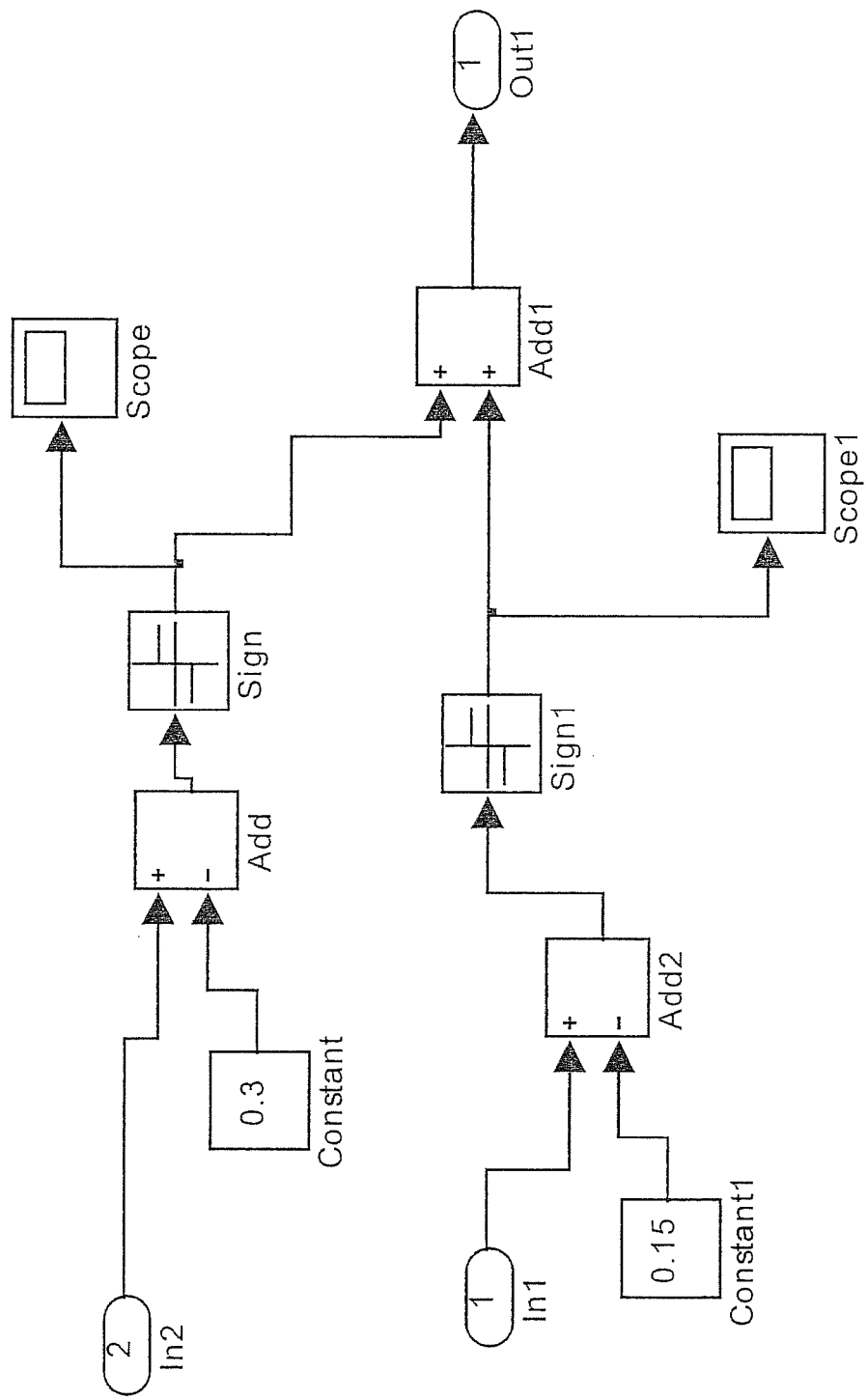
FIG. 14 is a block diagram of a danger control subsystem.

FIG. 10 shows the main part of the power split controller. Here, fast charging and fast discharging blocks were implemented for battery and super-capacitor if either or both the SOCs are out of its working range. Another danger the control system protects against is keeping the battery and super-capacitor hybrid from both fully depleted.

A limit was put on the battery output power as plus and minus 80 kW, which keeps the battery efficiency higher than 25%.

Here, it is not necessary to plot every subsystem of normal mode or fast charging/discharging mode, since they follow the power splitting strategy. For the optimal control in power splitting, it is only assumed that α, β, γ=1. Thus, the importance for every weighted items discussed before in power split control are assumed to be the same.

Energy Storage System Block

Figure 15:
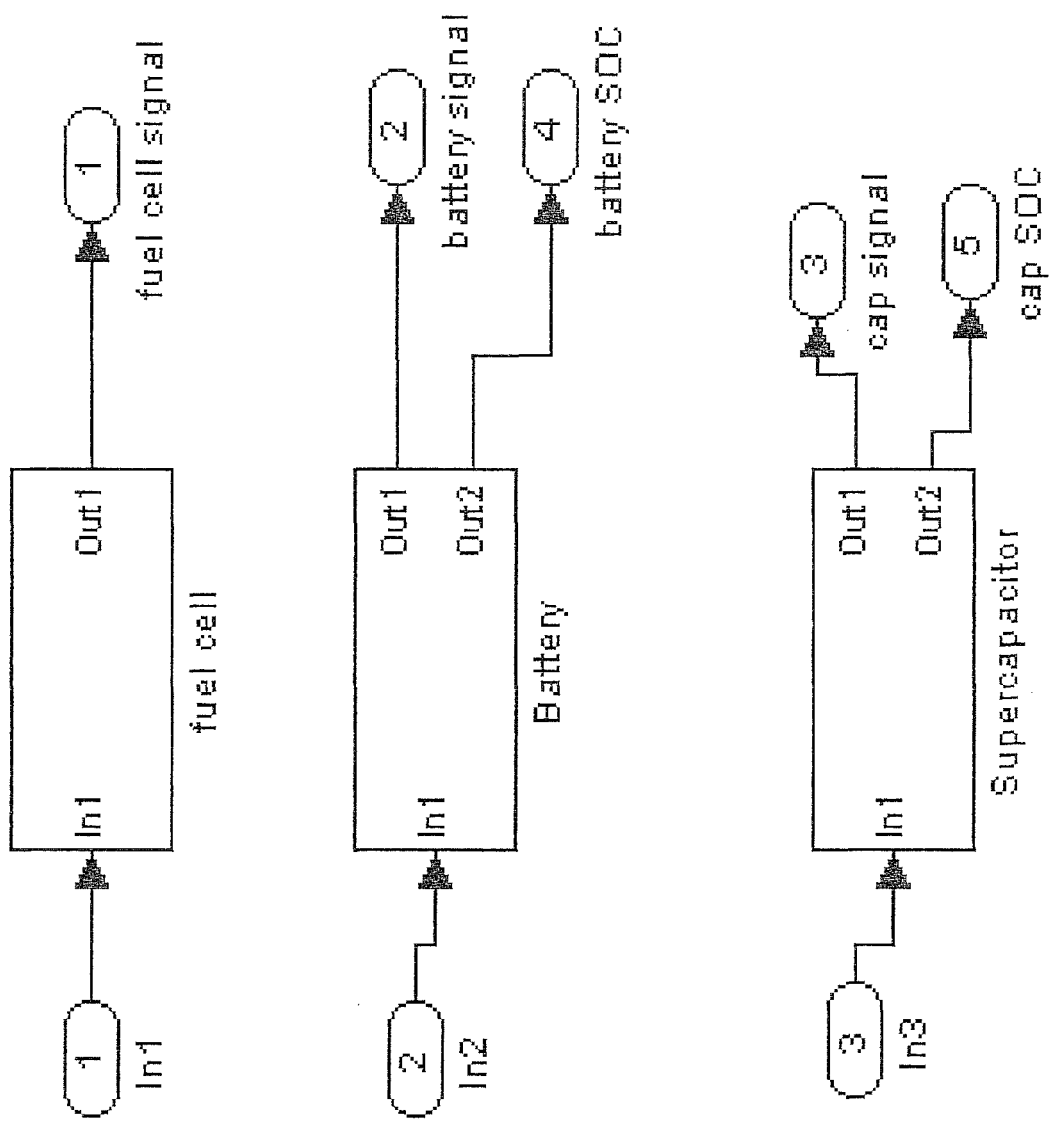
FIG. 15 is a block diagram of an energy storage system.

The energy storage system block is shown in FIG. 15. All sub-blocks are shown in sequence.

Fuel cell Model

Figure 16:
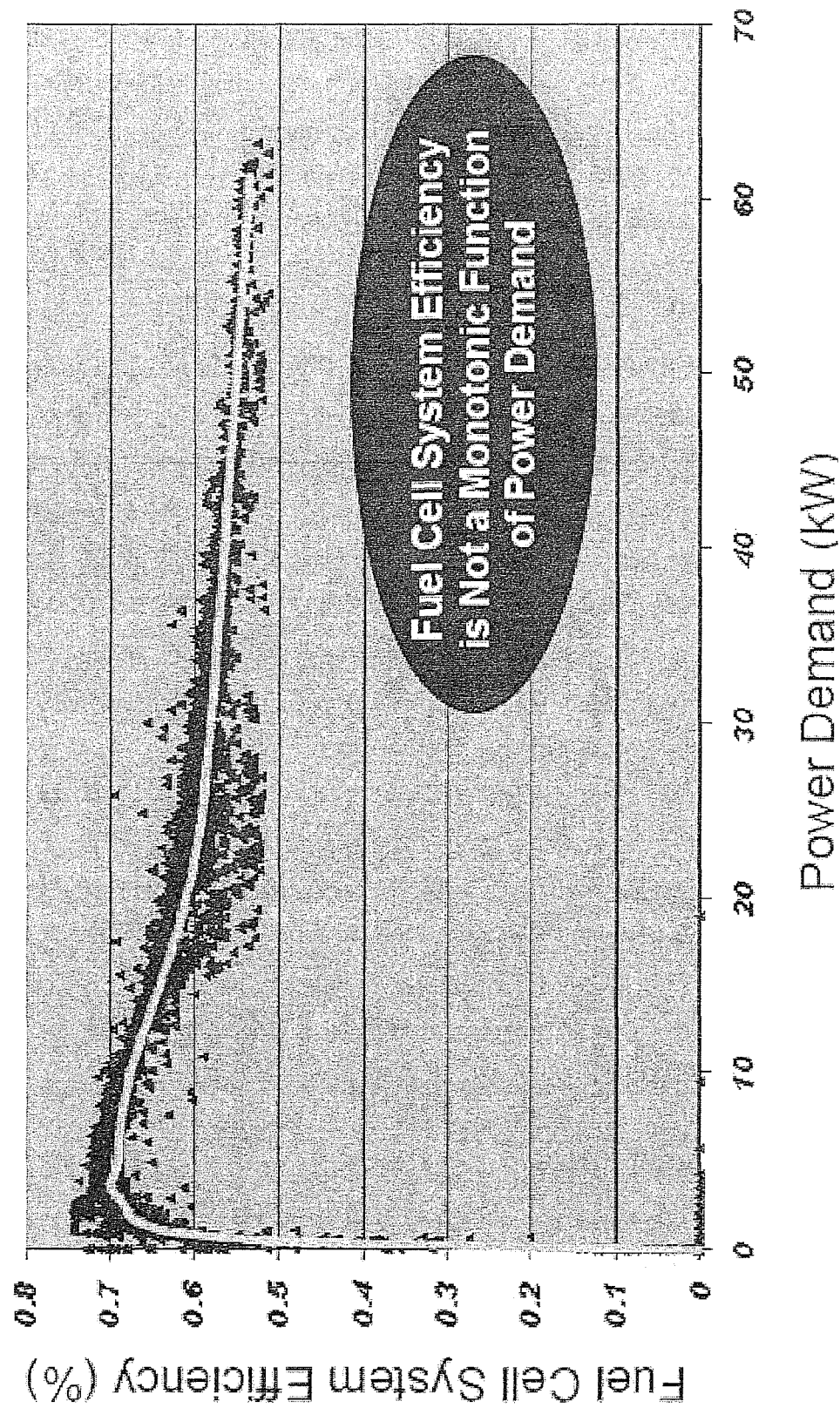
FIG. 16 is a graph of fuel cell efficiency versus power demand.

A figure of fuel cell efficiency in relationship with power request is shown in FIG. 16. Although there has been no simple math description of the fuel cell efficiency, it can be simply concluded that there could be two linear curves determining the efficiency.

When power demand is from 0 to 5 kW, the efficiency is linearly increasing from 0 to 70%. Also, when power demand is from 5 KW to the rated 48 KW of our fuel cell, the efficiency is linearly decreasing from 70% to 55%. Note here that although the fuel cell response is quite bad under 5 KW power demand, it still needs to be kept always on, since a frequent turn on and off sequence wastes much more energy. Besides, a turned-off fuel cell cannot respond fast to a sudden power demand, as introduced before.

Notice that the efficiency here is different from the efficiency of the fuel cell controller. The latter one is the efficiency from the fuel cell output side to the power bus, while the previous one is the loss of hydrogen due to some fuel cell internal characteristics. The model here predicts the real energy cost by the fuel cell. Here the converter loss is estimated to be another 20%. The rough estimation is plotted as in FIG. 17.

Battery Model

The battery block receives the power request from the power split controller and the auxiliary loads power, and returns the battery state of charge to the fuel cell controller and outputs the real energy required. The power request can be either positive or negative depending on whether or not regenerative braking is being used. Auxiliary load power is always positive and accounts for power used by systems such as the headlights, and stereo system on the vehicle. This model assumes a constant auxiliary power load (1 kW) and does not account for power variances from sources such as climate controls, head lights on or off, or power steeling.

The batteries block relies on information from the battery manufacturer on specific details relating to the batteries' performance. Using the manufacturer's data the battery discharge time is determined for the instantaneous power being taken from or added to the batteries. For NIMH battery, efficiency is relative constant below a discharge rate of 1 C, however, the battery will have to tolerate higher rate of charge and discharge for the vehicle. Here, one would use a model in (Mucha, 2001), and the batteries' effective efficiency is determined using (49).

$$\eta_{batteries} = \frac{ln\left(\frac{1}{P^{1.28}}\right) + 15.96}{3*ln(10)} \qquad (49)$$

Where P is in kW, is P is negative, then only the real part of the result is used. The battery efficiency curve is plotted as in FIG. 19.

With the effective efficiency of the batteries known, the actual energy that is put into the batteries during recharge and the energy removed from the batteries during discharge can be calculated using (50) where $P_{batteries}$ is the power drawn from or put back into the batteries and P is the power needed from the batteries or the power available to charge the batteries.

$$P_{batteries} = P*\eta_{batteries}; P < 0 \qquad (50)$$

$$P_{batteries} = \frac{P}{\eta_{batteries}}; P > 0$$

The energy added or removed from the battery is used to calculate the battery state of charge. The battery pack has a nominal capacity of 55 W.h/kg*24 kg=1320 W.h. To determine the energy in the pack, during each time step of the simulation, the model determines how much energy was added or removed from the batteries during that time step using (51);

$$E_{batteries} = E_{(t-1)} - \frac{P_{batteries}}{3600} \qquad (51)$$

With the quantity of energy in the batteries known, the SOC is calculated using (52):

$$SOC = \frac{E_{batteries}}{1320} \qquad (52)$$

The batteries block calculates the total energy into and out of the batteries using (53). The converter loss is assumed to be 30%.

$$E_{batteries} = \int P_{batteries} dt \quad (53)$$

Figure 20:
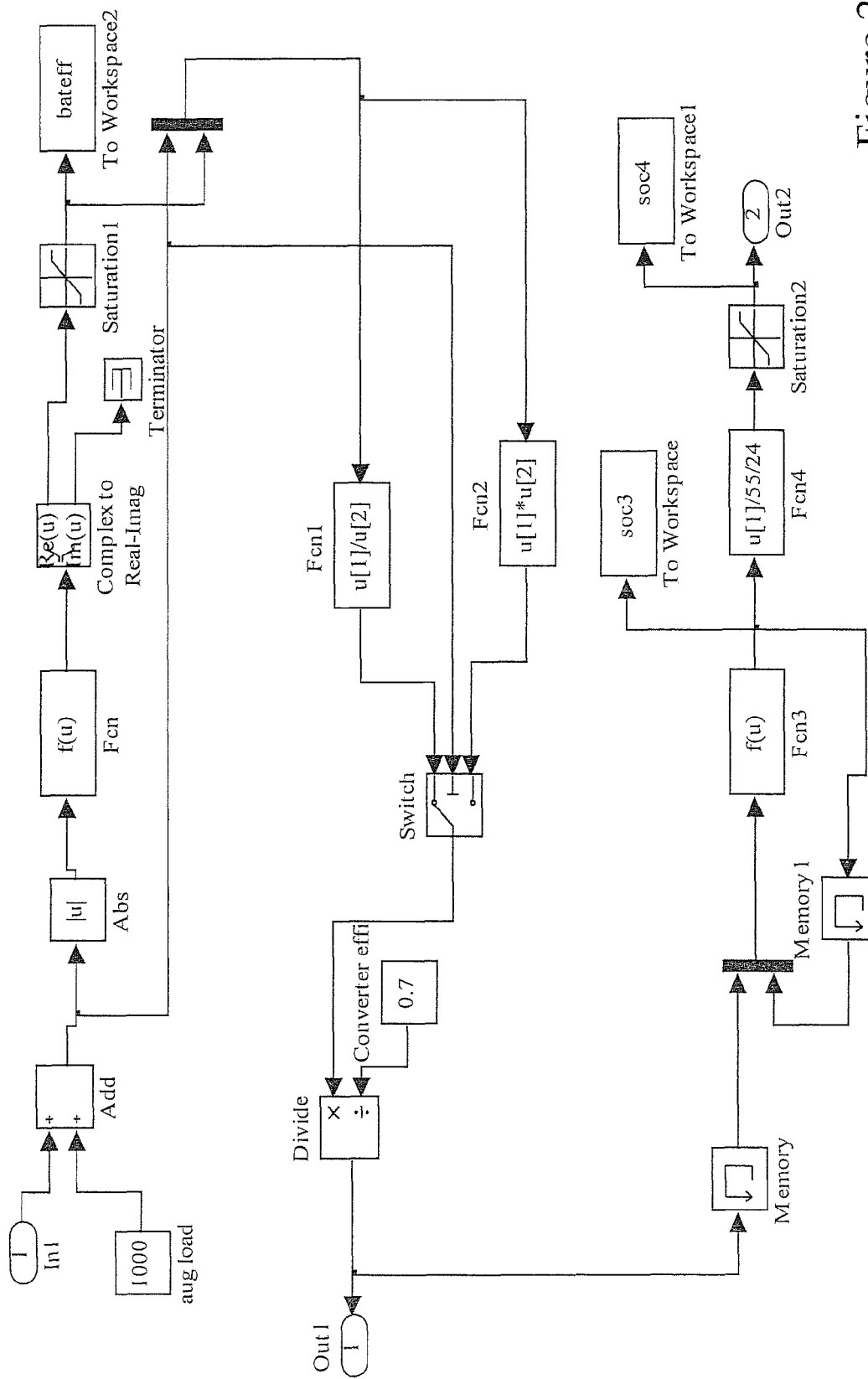
FIG. 20 is a block diagram of a battery system.

The battery model is shown in FIG. 20.

Figure 21:
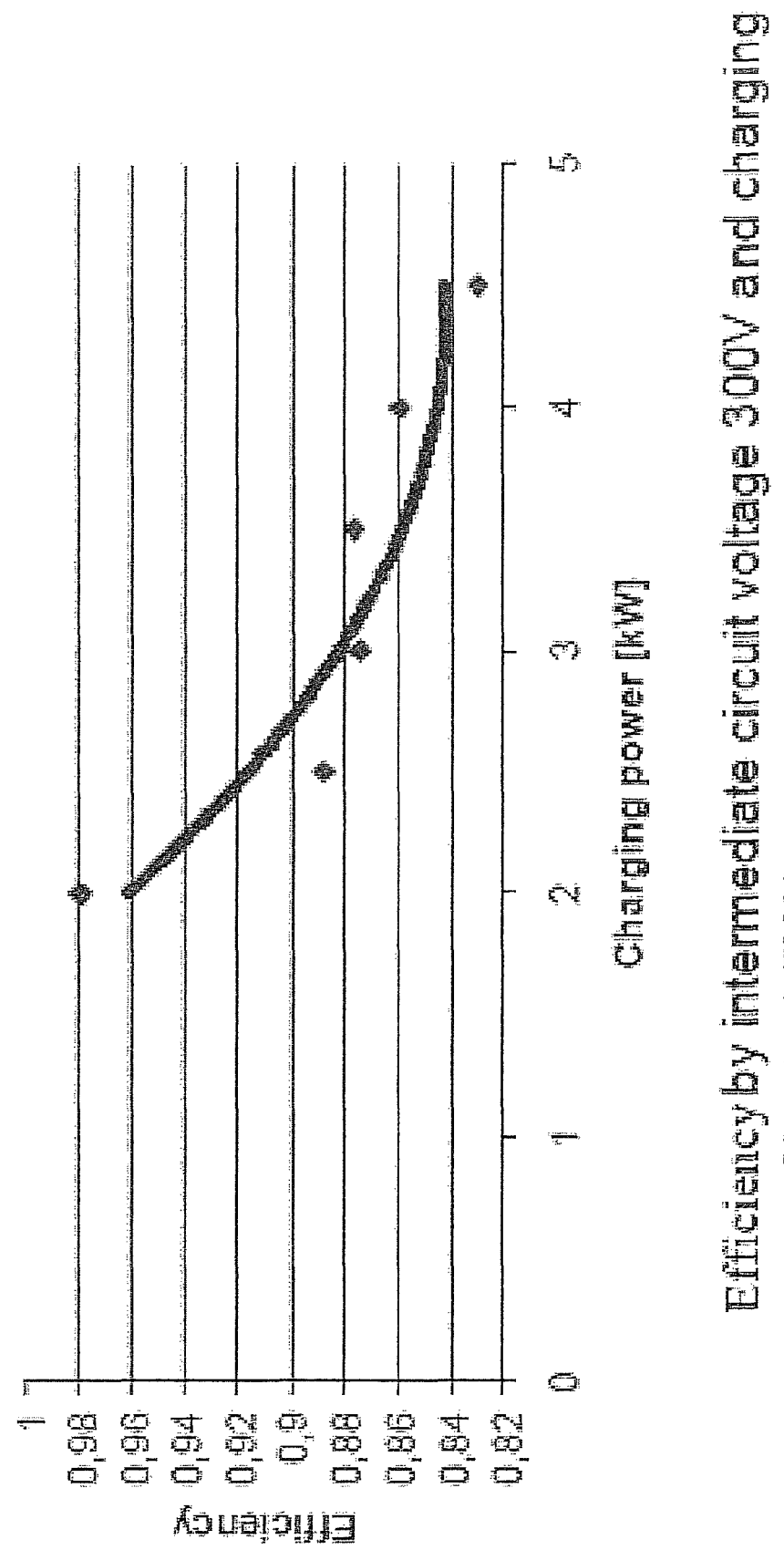
FIG. 21 is a graph of super-capacitor efficiency versus power request.

Super-Capacitor Model:

The super-capacitor cell efficiency curve in FIG. 21 is a Siemans100F, 56V, 400A super-capacitor. If 4 cells are connected in series, this would be exactly the design here in the present invention. It is assumed that when connected in series, all cells' efficiencies are the same as they were individually tested.

Assume charge and discharge process are:

$$P_{cap} = P * \eta_{cap}; P < 0$$
$$P_{cap} = \frac{P}{\eta_{cap}}; P > 0 \quad (54)$$

A further estimation is that super-capacitors connected in parallel charge or discharge at the same rate and each cell has the characteristic plotted in FIG. 21. When a super-capacitor is discharged at a rate of less than 2*4=8 kW, the efficiency is kept high at 98%. When the whole stack is discharged at higher than 4.5*4=18 kW, the efficiency is kept low at 84%, the efficiency is exponentially decreasing during this period.

Figure 22:
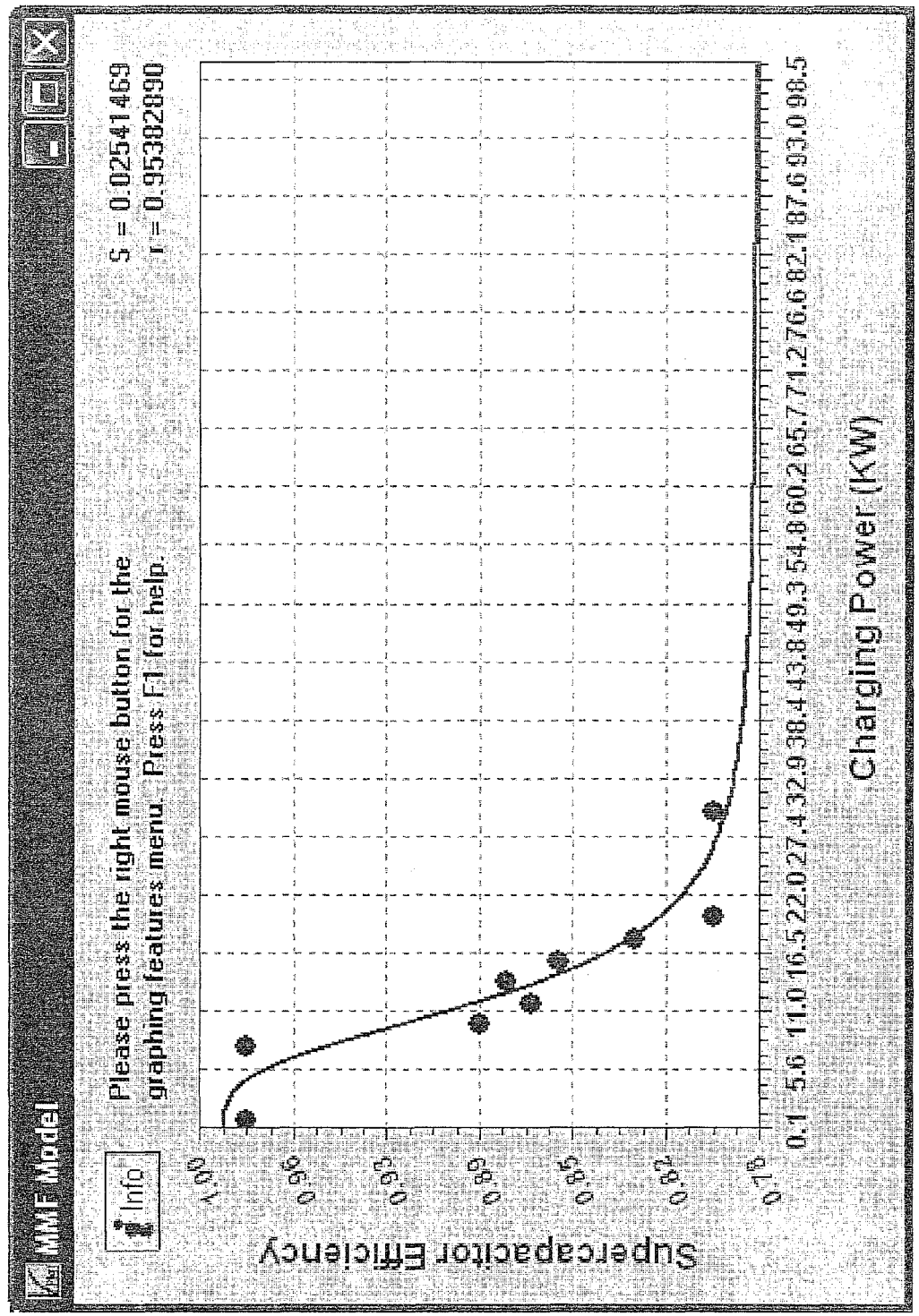
FIG. 22 is a computer screen image of a fitted super-capacitor efficiency curve.

For the super-capacitor efficiency table, the software "Curve Expert" was used to fit the curve. Note that the super-capacitor power output has a limit of 1 kW, as already known. FIG. 22 shows a curve based on the MMF model is proven to be the best curve fitting the test data.

Figure 23:
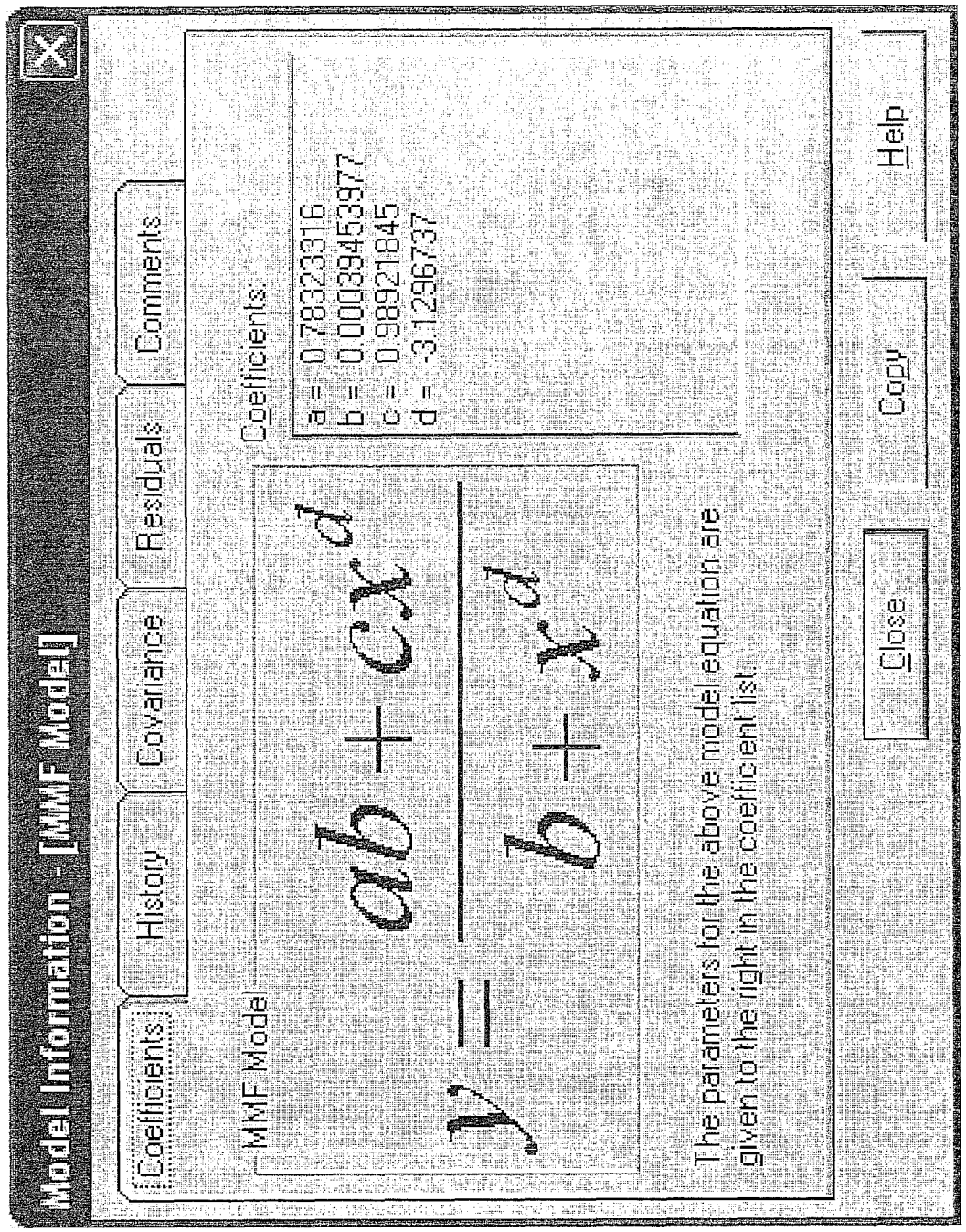
FIG. 23 is a computer screen image of a fitted function for super-capacitor efficiency.
Figure 24:
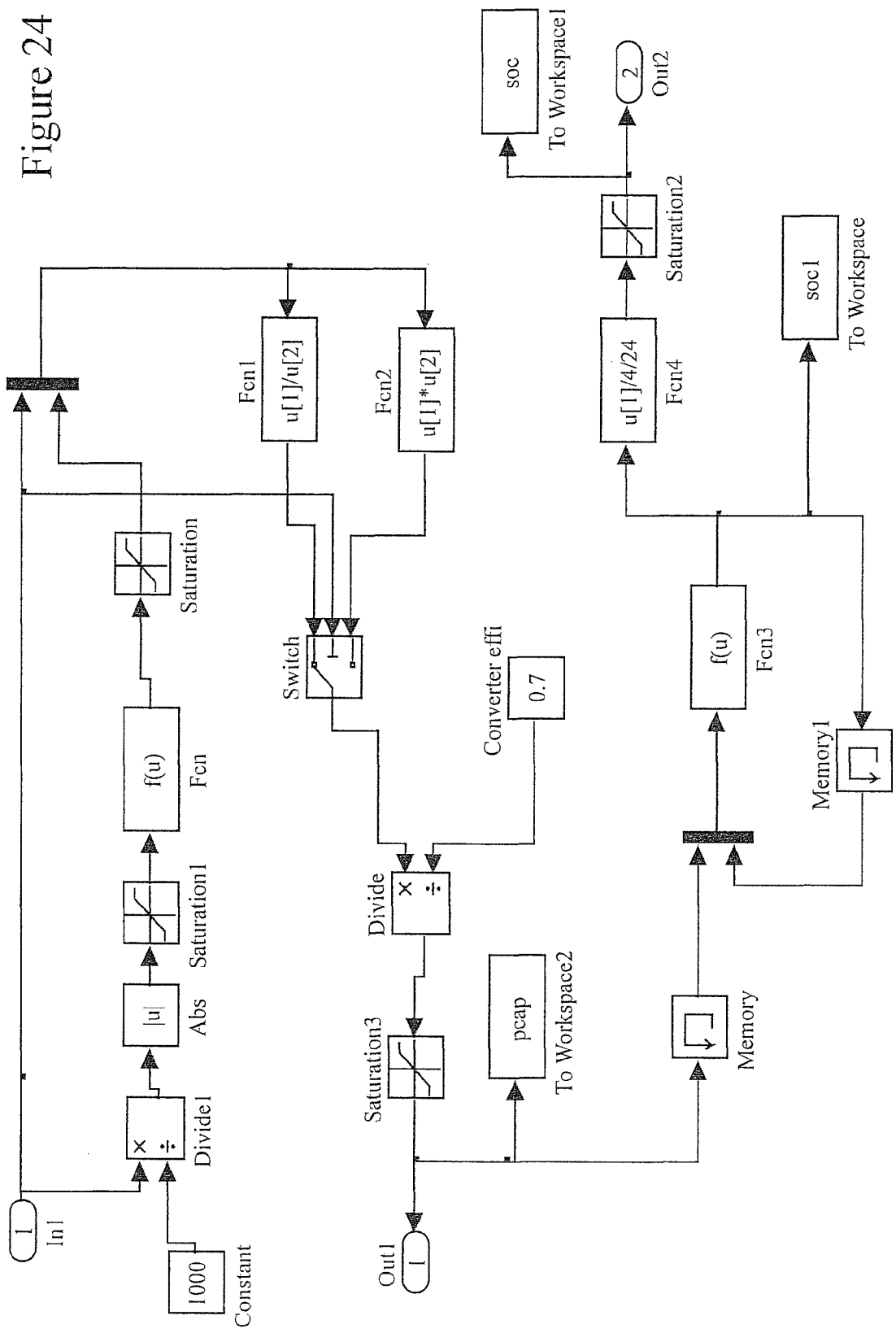
FIG. 24 is a block diagram of a super-capacitor model.

It is shown that a function given in the FIG. 23 is a very good curve fit for the test data. The charging or discharging efficiency above 30 KW is considered 78% at steady state. The Simulink model is shown in FIG. 24.

Results

Short Highway Driving Cycle

Figure 25:
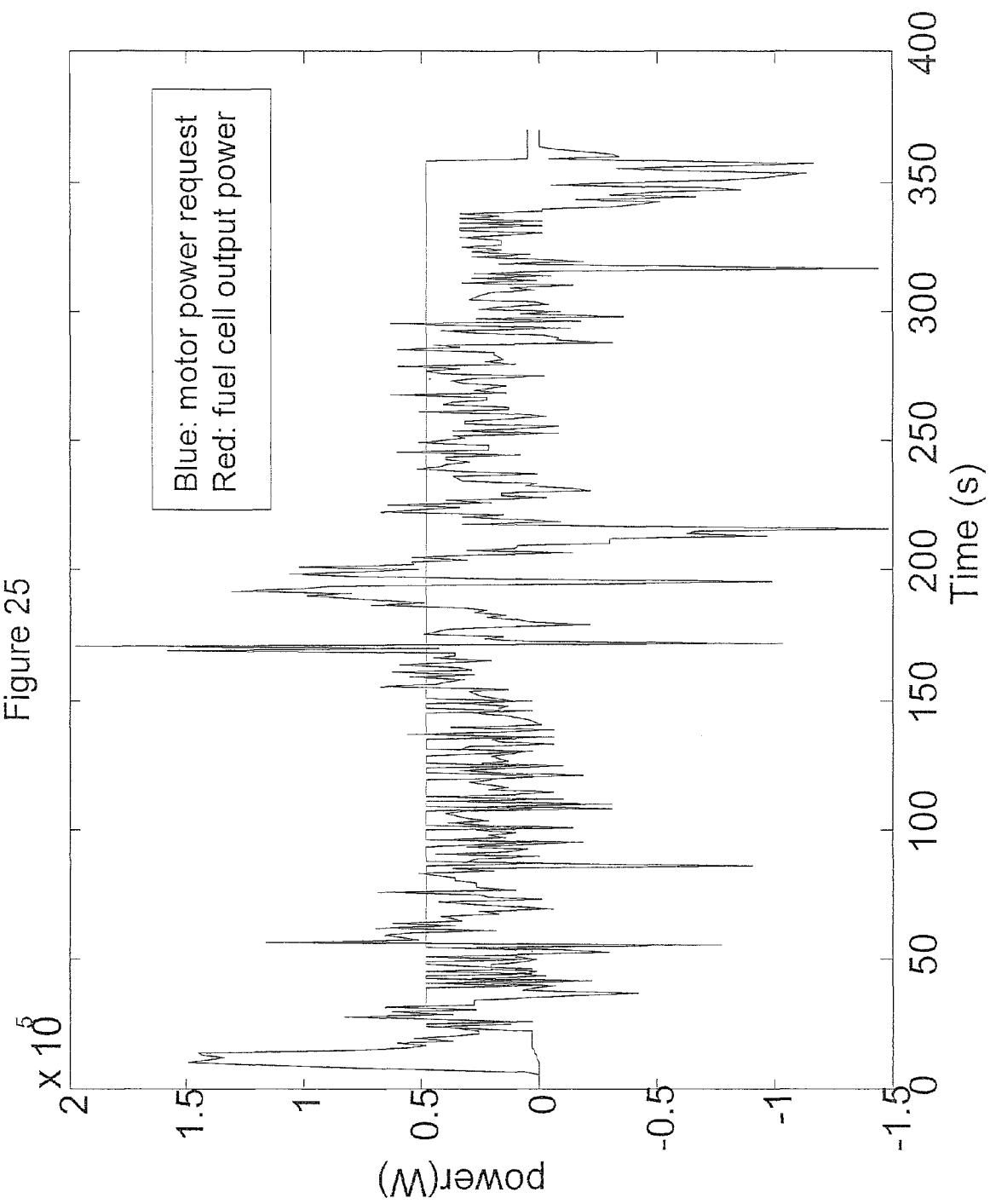
FIG. 25 is a graph of optimal power request and fuel cell output power versus time during highway driving: blue indicates motor power request and red indicates fuel cell output power.

FIG. 25 shows the programmed motor power request and the related fuel cell output power, the respond time of fuel cell is required to be 1 second, which is possible in all PEM fuel cells yet produced. A minimum power output is set as a bottom limit so that the numbers of turn-on and turn-off processes are minimized to avoid loss. It is shown that for a short highway driving cycle, the energy cost by the fuel cell is less than the thermostatic control strategy.

Figure 26:
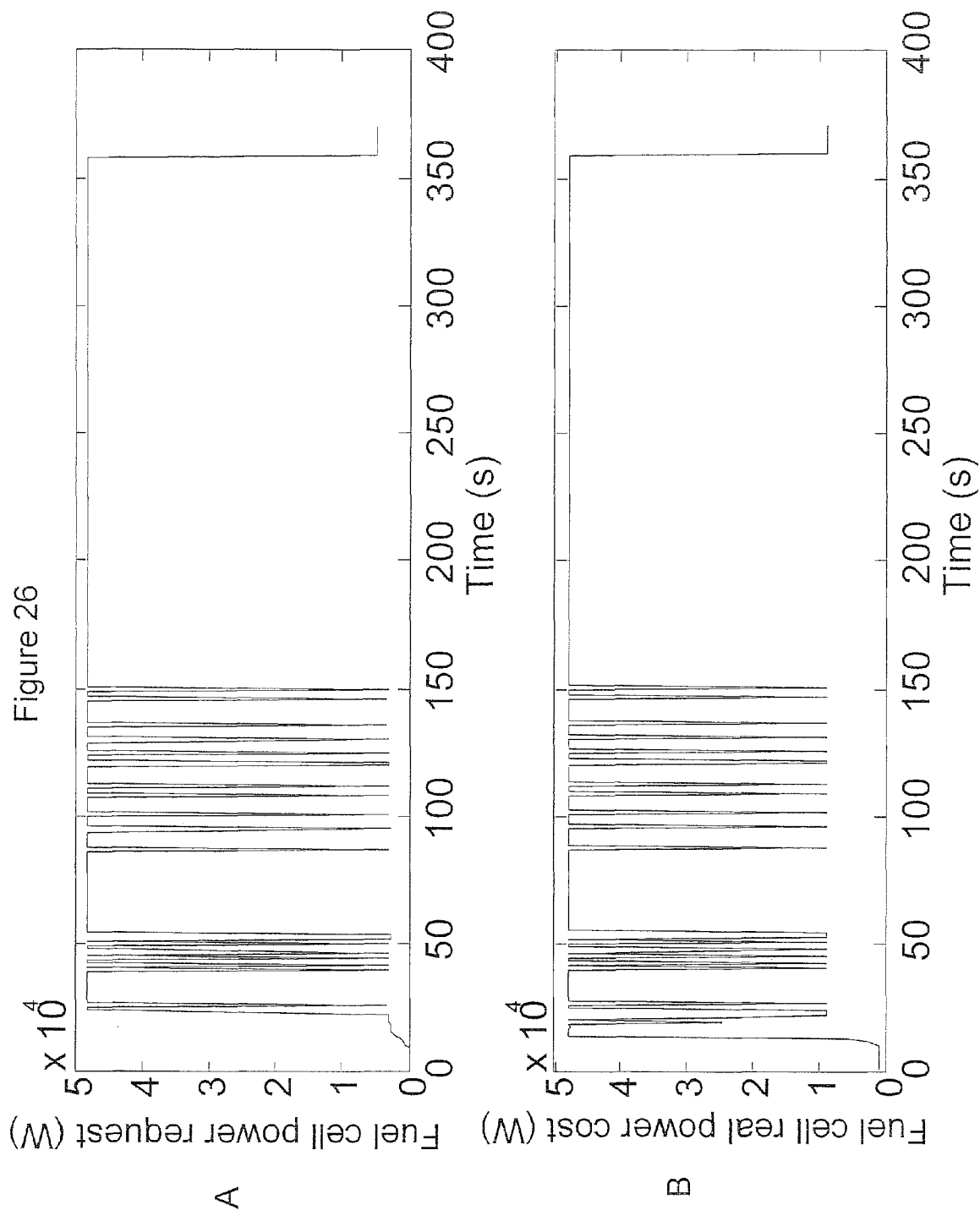
FIGS. 26A and 26B are graphs of calculated fuel cell power request (A) and real power used (B)

FIGS. 26A and 26B show the fuel cell power request at the motor end compared to the real fuel cell power needed. The bottom plot 26B is different for three reasons. First, there is some loss in fuel cell based on its operating efficiency. Second, the fuel cell is required to generate more power when the output power limit for the battery or super-capacitor is reached to protect the battery and super-capacitor. Third, when the battery and super-capacitor SOC are both high, then fuel cell only gives a minimum power.

Figure 27:
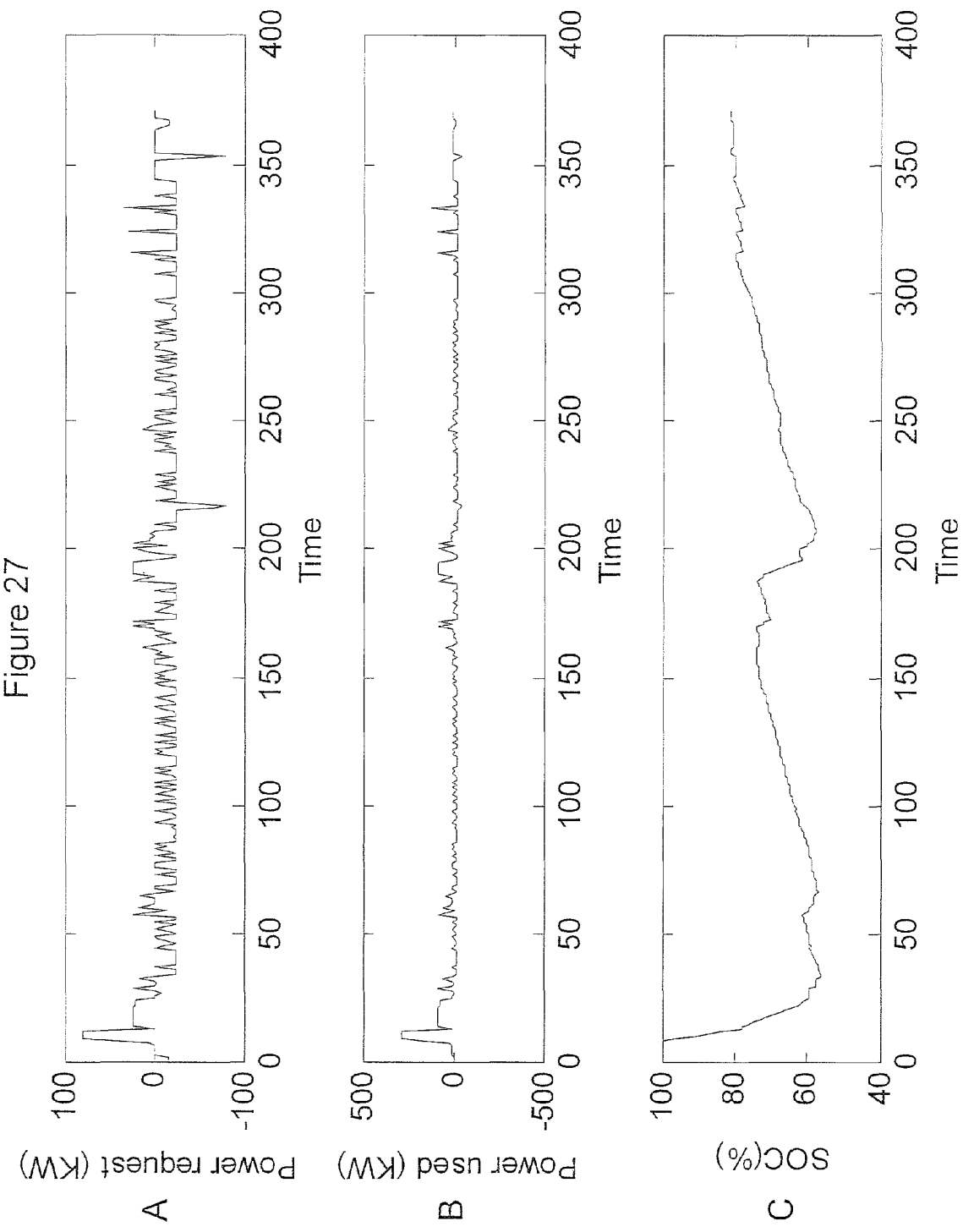
FIGS. 27A, 27B, and 27C are graphs of battery performance versus time: power request (A), power used (B), and state of charge (SOC) (C)

FIGS. 27A-C show the information on battery throughout a short US06 driving cycle. FIG. 27A is the required output or input power at the battery side, FIG. 27B shows the real power cost of the battery due to loss of efficiency, and FIG. 27C shows the variation of battery SOC. Note there is a limit on output power at 80 kW.

Figure 28:
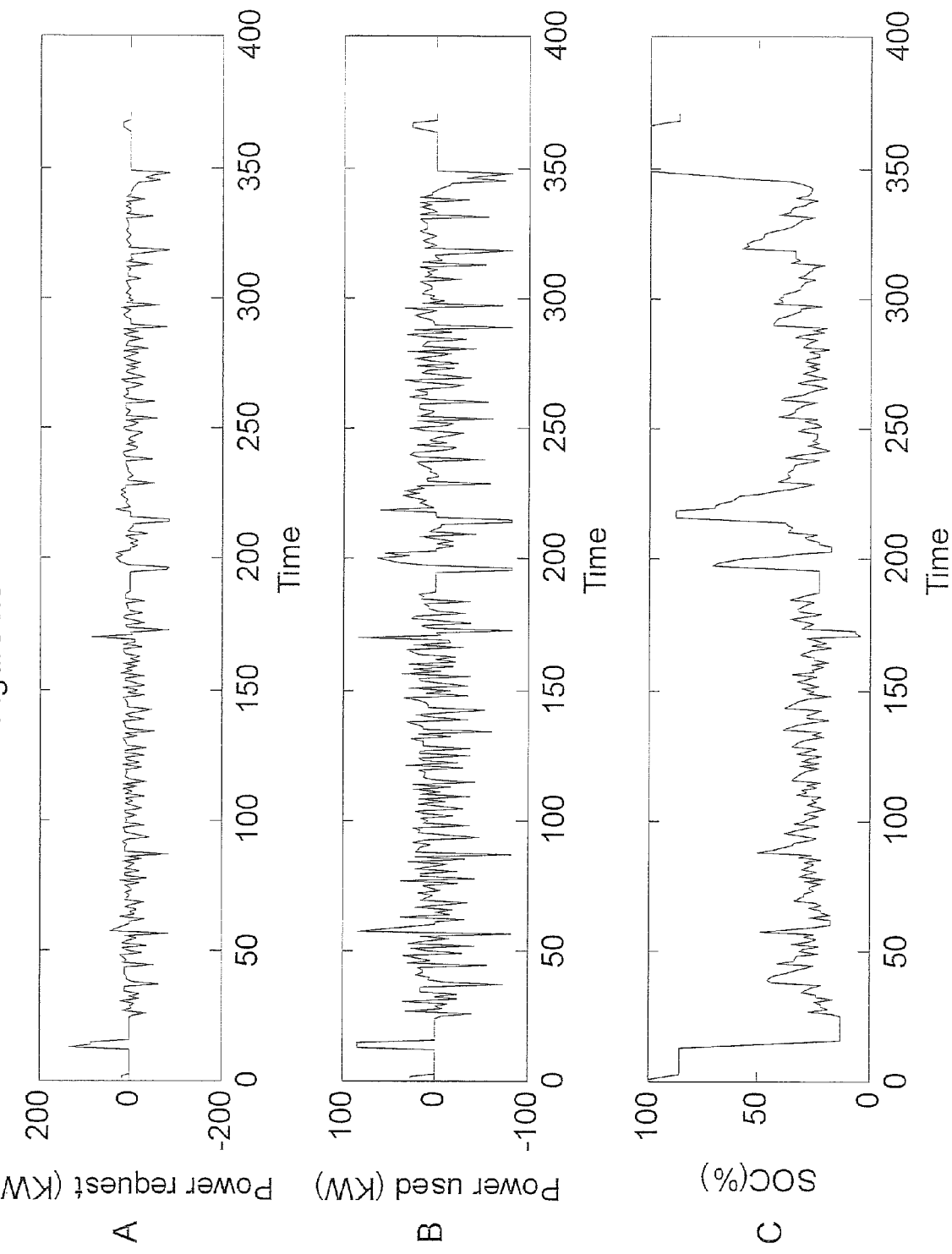
FIGS. 28A, 28B, and 28C are graphs of super-capacitor performance versus time: power request (A), power used (B), and SOC (C)
Figure 29:
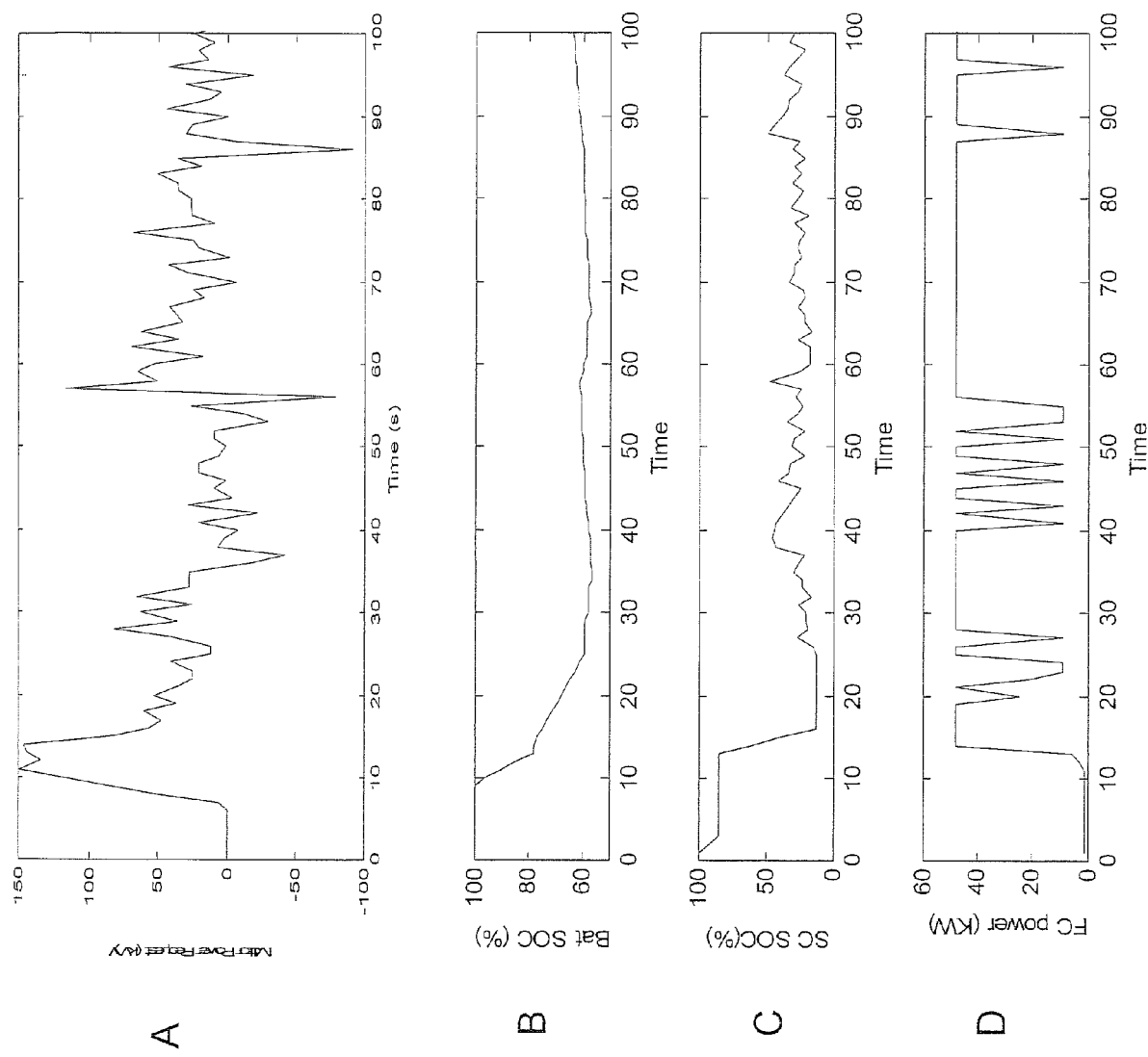
FIGS. 29A, 29B, 29C, and 29D are graphs of system performance versus time when initial battery SOC is 100%: motor power request (A), battery SOC (B), super-capacitor SOC (C), fuel cell power (D)
Figure 30:
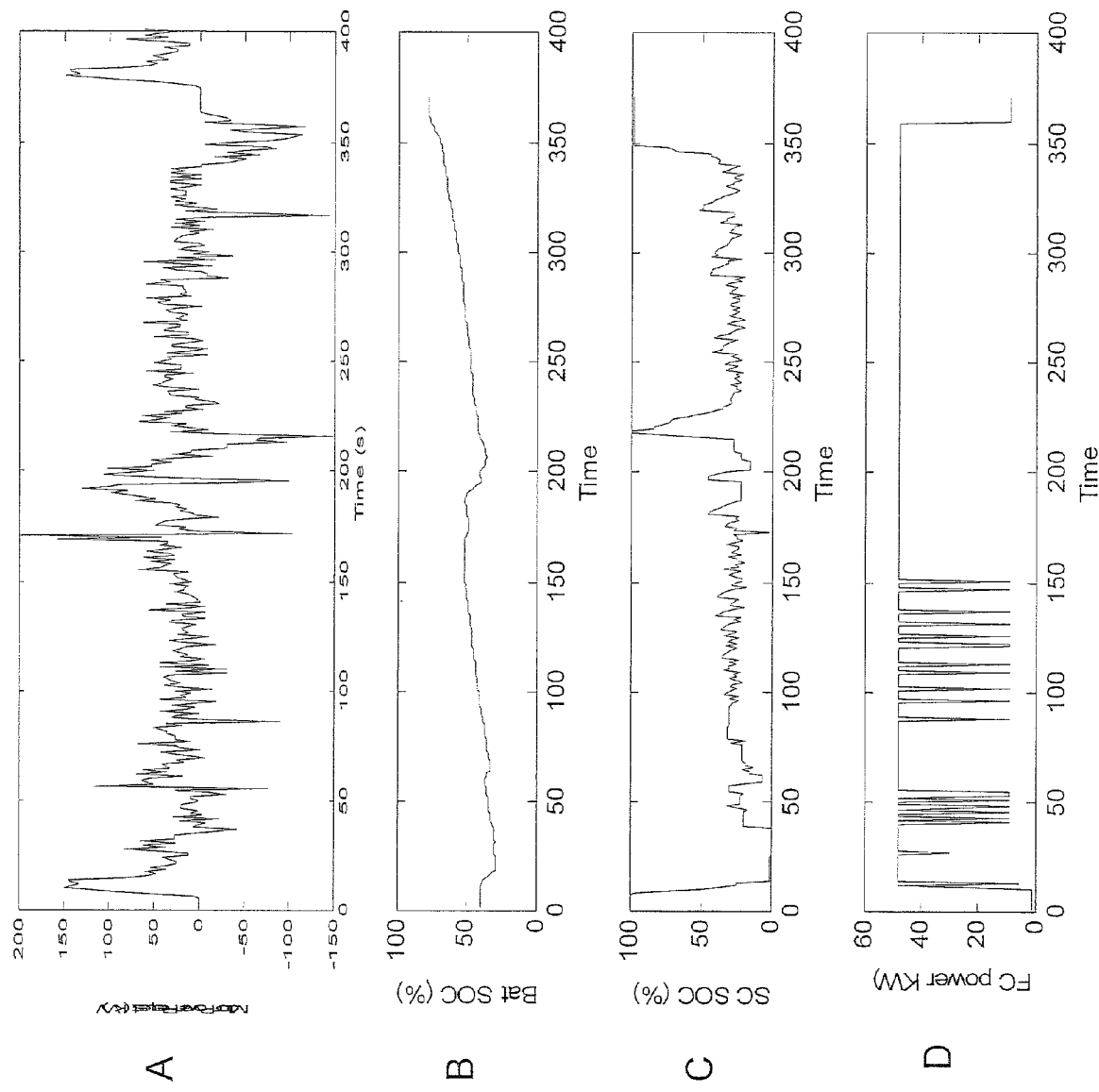
FIGS. 30A, 30B, 30C, and 30D are graphs of system performance versus time when initial battery SOC is 40%: motor power request (A), battery SOC (B), super-capacitor SOC (C), fuel cell power (D)

FIGS. 28A-C shows the super-capacitor SOC and power output during the short driving cycle. The super-capacitor refuses to take in power when SOC reaches 100%. Since battery SOC never falls down below 40%, the super-capacitor is protected by setting the charging mode limit at 25%.

Referring to FIGS. 29A-D, when both the initial SOCs are 100%, the motor power demand is 0 at first. Thus the fuel cell is turned on to run itself first then provide a minimum power to keep it running. When a sudden power request happens at 10 seconds, the battery capacity is 100%, which is not in a desirable operating range. Therefore, the battery discharges first, while the fuel cell output power follows an optimal controlled sequence. Since the motor power request is quite high at 13 seconds and FC/B hybrid does not respond that fast, super-capacitor is discharged at first. The system becomes steady afterwards.

Another situation that may be interesting is if the battery is not pre-charged when you start up a vehicle and have no time to wait. The worst case is when the battery initial SOC is only 40% at the beginning, and there is a sudden motor power request which happens at 10 seconds. Under these conditions the battery may fall out of control. However, our optimal controller ensures that the battery will only face a little more loss in efficiency (or battery life) and will be re-charged during the driving process.

FIGS. 30A-D show a response with the initial battery SOC is only 40% and super-capacitor SOC 100%, when the sudden power demand happens at 10 seconds, the super-capacitor will do its best to get discharged first thus to protect the battery from depleted, however, the sum of fuel cell power and super-capacitor power is still not large enough, (when super-capacitor is depleted), thus, the battery still gives out some power when its SOC falls down to about 35% (but the motor power request is still met). During the rest of the driving cycle, the battery gradually recovers to around 60% SOC. A sharp drop in SOC may slightly reduce the battery and super-capacitor lives, thus it is always necessary to plug-in the vehicle when stopped. However, the control system ensures that the vehicle is being driven properly at any given time and any given speed.

Based on simulated results, a comparison was done between the control strategy of this invention and a conventional thermostatic controller. The comparison was done for several driving cycles and the results are given in Table II. For all the instances there was a considerable reduction in the energy requirement for the controller of this invention.

TABLE II

Summary of various driving cycles

| | City Driving | Highway Driving | Long City | Long Highway |
|---|---|---|---|---|
| Time (s) | 1370 | 369 | 16440 | 17712 |
| Distance (miles) | 7.45 | 6.236 | 89.4 | 299.33 |
| Average speed (mph) | 19.58 | 60.84 | 19.58 | 60.84 |
| Maximum speed (mph) | 56.7 | 80.3 | 56.7 | 80.3 |
| Average traction power (KW) | 3.21 | 18.28 | 3.21 | 18.28 |
| Maximum traction power (KW) | 75.05 | 197.6 | 75.05 | 197.6 |
| Maximum braking power (KW) | 58.82 | 148.8 | 58.82 | 148.8 |
| Energy Cost Thermostatic Control (KW · h) | 5.67 | 4.68 | 73.71 | 224.64 |
| Energy Cost Optimal Control (KW · h) | 3.05 | 4.37 | 39.65 | 209.76 |

The thermostatic control results given in Table II are based on a fuel cell battery hybrid. The optimal control results are obtained using the fuel cell battery hybrid combined with the battery ultracapacitor hybrid described in this invention. The optimal control saves 46.21% of energy in long city driving cycle and 6.62% of energy in highway driving cycle. In the highway driving application, the fuel cell is almost always turned on at full power (saturated result), thus optimal results are seldom reached. It is anticipated that with a larger fuel cell, the efficiency can be further increased. Moreover, since battery SOC is strictly monitored and controlled around 60%, battery life will be increased, providing a large benefit which is hard to estimate.

EXAMPLE 2

Instruction on Simulating the FCEV Power System

Figure 31:
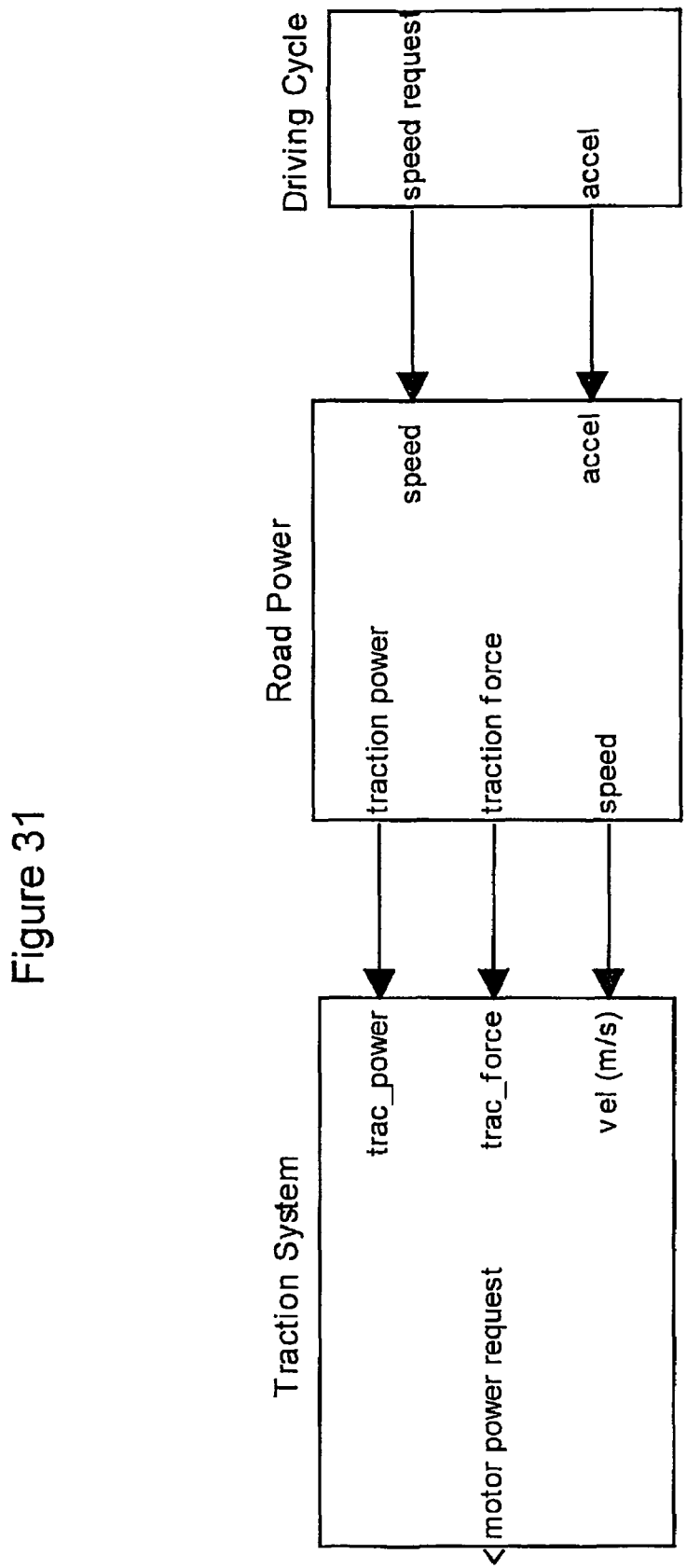
FIG. 31 is a block diagram of simulating the FCEV power system.

1. First, for any driving cycle to be tested, determine the motor power request by simulating the blocks in FIG. 31. The result is a variable "pmotor"

2. Execute the following program, and it gives the fuel cell control signal "u"

```
%%%%% Fuel cell/ Battery optimal control program for i=1:100
p1(i)=i*1000
p2(i)=-i*1000
miu1(i)=(log(1/p1(i)^1.28)+15.96)/3/log(10)
miu2(i)=(real(log(1/p1(i))^1.28)+15.96)/3/log(10)
if miu1(i)<=0
miu1(i)=0.2
elseif miu1(i)>1
miu1(i)=1
end
if miu2(i)<=0
miu2(i)=0.2
elseif miu2(i)>1
miu2(i)=1
end
end
N1=5
r(1)=500
p=1
q(1)=1/r(1)
a=1
b=0.9
N=17711
C=24.1*55*3600;
x0=C
ref=1;
E(1)=C
gain=0.05
    for t=1:(N-mod(N,N1))/N1
    S(t*N1+1)=p;
    v(t*N1+1)=0.8*C*ref*p;
    miumiu=1
    for w=t*N1:-1:(t-1)*N1+1
    div=r+S(w+1)*(b*miumiu)^2;
    K(w)=b*S(w+1)*miumiu/div;
    S(w)=q+S(w+1)*r/div
    K3(w)=b*pmotor1(w)*S(w+1)*miumiu^2/div;
    v1=S(w+1)*(0.81*miumiu^2*v(w+1)-pmotor1(w)*r*miumiu);
    v(w)=v(w+1)+0.6*C*q-v1/div;
    Kv(w)=0.9*miumiu/div;
    end
    x(1)=x0;
    for k=(t-1)*N1+1:t*N1;
    if x(k)>0.4*C
    u(k)=-K(k)*x(k)+Kv(k)*v(k+1)+K3(k);
    else
    u(k)=48000;
    end
    if u(k)<=0;
    u(k)=0;
    end
    if u(k)>=48000;
    u(k)=48000;
    end
```

```
%%%%% Fuel cell/ Battery optimal control program if P(k)~=0;
P(k)=P(k);
else
P(k)=1000;
end
ttt=abs(0.9*u(k)-P(k));
ttt1=round(ttt/1000);
if ttt1>100;
ttt1=100;
else if ttt1<=1;
ttt1=1;
end;
end;
miu3(k)=miu1(ttt1);
miu4(k)=miu2(ttt1);
if (0.9*u(k)-P(k))<0
x(k+1)=x(k)+(0.9*u(k)-P(k))/miu3(k);
miumiu=miu3(k)
else
x(k+1)=x(k)+(0.9*u(k)-P(k))*miu4(k);
miumiu=miu4(k)
end
end
if x(t)/E(1)<0.6;
r=r-gain*r*abs(x(t)/C-0.6);
q=1/r;
else
r=r+gain*r*abs(x(t)/C-0.6);
q=1/r;
end
if r>1000;
r=1000;
else if r<0.01;
r=0.01;
end
end
end
```

3. When having the above mentioned variables, simulate the Simulink model. This method is much faster than implementing the program into Simulink model. The battery efficiency and SOC are already predicted in the program.

Throughout this application, various publications, including United States patents, are referenced by author and year and patents by number. Full citations for the publications are listed below. The disclosures of these publications and patents in their entireties are hereby incorporated by reference into this application in order to more fully describe the state of the art to which this invention pertains.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims, the invention may be practiced otherwise than as specifically described.

REFERENCES

1. Wenzhong Gao *Performance comparison of a fuel cell-battery hybrid powertrain and a fuel cell-ultracapacitor hybrid power train IEEE transactions on vehicular technology*, Vol 54 2005

2. Jorge Moreno et. al. *Energy-Management System for a Hybrid Electric Vehicle, Using Ultracapacitors and Neural Networks IEEE Transactions on Industrial Electronics*, Vol. 53 No. 2 2006

3. Abhishek Drolia et. al. *An Approach to Connect Ultracapacitor to Fuel Cell Powered Electric Vehicle and Emulating Fuel Cell Electrical Characteristics using Switched Mode Converter IEEE* 2003

4. Joseph Michael Mucha, *System Control Strategies for a Series Hybrid Electric Vehicle* Master Thesis in Mechanical Engineering University of Illinois at Urbana-Champaign 2001

5. Frank L. Lewis & Vassilis L. Syrmos *Optimal Control* John Wiley &Sons, Inc. 1995

What is claimed is:

1. A method of controlling power flow in a vehicle, including the steps of:
   determining the amount of energy storage required for power source devices; and
   controlling power flow delivery between the power source devices by determining power requirements of the vehicle;
   based on a battery state, determining a required power command from a fuel cell by using a performance index;
   creating a feedback gain sequence to feedback information about the battery state to the power command for the fuel cell;
   creating a feedforward gain sequence to include information from an optimal control sequence into the fuel cell power command;
   dividing remaining power between the fuel cell and a super-capacitor.

* * * * *